United States Patent
Gibson et al.

(10) Patent No.: US 9,162,399 B2
(45) Date of Patent: Oct. 20, 2015

(54) HOLLOW, COMPOSITE-MATERIAL REBAR STRUCTURE, ASSOCIATED COMPONENTS, AND FABRICATION APPARATUS AND METHODOLOGY

(75) Inventors: Robert C. Gibson, Madison, WI (US); Thomas S. Ohnstad, Salem, OR (US); Matthew H. Noble, McMinnville, OR (US); Trent J. Garber, Albany, OR (US); Thomas A. Hershberger, Madison, WI (US); John R. Hillman, Wilmette, IL (US)

(73) Assignee: Composite Rebat Technologies, Inc., Salem, OR (US)

( * ) Notice: Subject to any disclaimer, the term of this patent is extended or adjusted under 35 U.S.C. 154(b) by 709 days.

(21) Appl. No.: 13/215,199

(22) Filed: Aug. 22, 2011

(65) Prior Publication Data

US 2012/0066994 A1  Mar. 22, 2012

Related U.S. Application Data

(60) Provisional application No. 61/385,502, filed on Sep. 22, 2010.

(51) Int. Cl.
*B29D 22/00* (2006.01)
*B29D 23/00* (2006.01)
(Continued)

(52) U.S. Cl.
CPC ............... *B29C 70/742* (2013.01); *B29C 70/52* (2013.01); *B29C 70/526* (2013.01);
(Continued)

(58) Field of Classification Search
CPC .... B29C 70/528; B29C 70/742; B29C 70/52; B29C 70/74; B29C 70/526; B29C 70/527; E04C 5/03; E04C 5/07; E04C 5/20; B29D 23/00; B29L 2009/00; B29L 2023/00; B29L 2022/00; B29L 2031/10
USPC ........... 428/36.9, 36.91, 35.8, 447, 450, 36.4; 138/146; 52/309.13, 853, 834
See application file for complete search history.

(56) References Cited

U.S. PATENT DOCUMENTS 3,283,050 A   11/1966  Boggs
4,265,981 A    5/1981  Campbell
(Continued)

FOREIGN PATENT DOCUMENTS

DE          2500375        8/1976

OTHER PUBLICATIONS

"FRP Fire Resistance". 1p.
(Continued)

*Primary Examiner* — Michael C Miggins
(74) *Attorney, Agent, or Firm* — Kolisch Hartwell, P.C.

(57) ABSTRACT

Elongate, composite-material, hollow rebar structure, along with associated components, related fabrication apparatus, and apparatus-implemented, rebar-structure-making methodology. The rebar structure has a long axis, and includes (a) an elongate, hollow core centered on that long axis, (b) an elongate, hollow sleeve having inner and outer surfaces, circumsurrounding the core along the core's length, with the sleeve's inner surface bonded to the core's outer surface along the length thereof, and (c) longitudinally distributed, radial-dimensionality, external-purchase-enhancing structure formed unitarily with the sleeve's outer surface along the length thereof. The bond existing between the core and the sleeve takes the form of a single-cure, reverse-temperature-gradient-cure, plastic-material, molecular bond.

32 Claims, 6 Drawing Sheets

Figure 9:
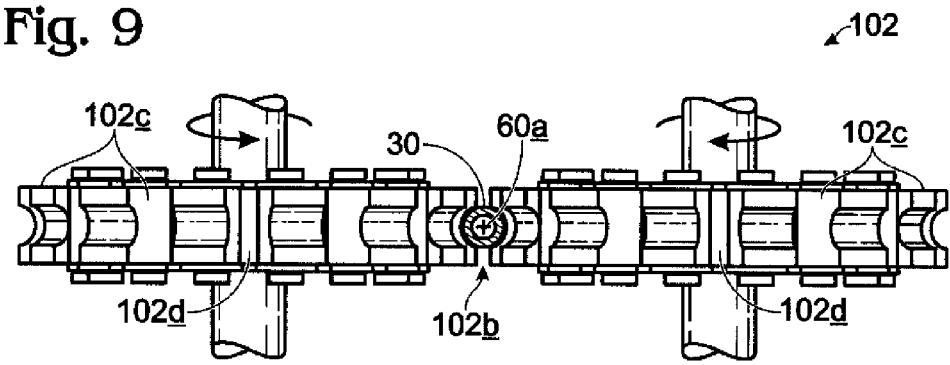

(51) Int. Cl.
  *B32B 1/08* (2006.01)
  *B29C 70/74* (2006.01)
  *B29C 70/52* (2006.01)
  *E04C 5/03* (2006.01)
  *E04C 5/07* (2006.01)
  *E04C 5/20* (2006.01)
  *B29L 9/00* (2006.01)
  *B29L 23/00* (2006.01)
  *B29L 22/00* (2006.01)
  *B29L 31/10* (2006.01)

(52) U.S. Cl.
  CPC ............ *B29C 70/527* (2013.01); *B29C 70/528* (2013.01); *B29C 70/74* (2013.01); *B29D 23/00* (2013.01); *E04C 5/03* (2013.01); *E04C 5/07* (2013.01); *E04C 5/20* (2013.01); *B29L 2009/00* (2013.01); *B29L 2022/00* (2013.01); *B29L 2023/00* (2013.01); *B29L 2031/10* (2013.01)

(56) References Cited

U.S. PATENT DOCUMENTS

| | | | |
|---|---|---|---|
| 4,296,060 A | 10/1981 | Killmeyer et al. | |
| 4,780,166 A | 10/1988 | Hunter | |
| 4,814,133 A | 3/1989 | Matsuno et al. | |
| 5,055,324 A | 10/1991 | Stecker | |
| 5,084,221 A | 1/1992 | Matsuno et al. | |
| 5,166,230 A | 11/1992 | Stecker | |
| 5,182,064 A | 1/1993 | Ishizuka et al. | |
| 5,567,374 A | 10/1996 | Thicthener et al. | |
| 5,593,536 A | 1/1997 | Kaiser | |
| 5,593,744 A | 1/1997 | Van Vechten et al. | |
| 5,609,806 A | 3/1997 | Walsh et al. | |
| 5,626,700 A | 5/1997 | Kaiser | |
| 5,650,109 A | 7/1997 | Kaiser et al. | |
| 5,702,816 A | 12/1997 | Kaiser | |
| 5,729,952 A | 3/1998 | Dahl | |
| 5,763,042 A | 6/1998 | Kaiser et al. | |
| 5,851,468 A | 12/1998 | Kaiser | |
| 5,876,553 A | 3/1999 | Kaiser | |
| 5,904,886 A | 5/1999 | Stecker | |
| 5,950,393 A | 9/1999 | Stecker | |
| 5,966,895 A | 10/1999 | Stecker | |
| 6,023,903 A | 2/2000 | Stecker | |
| 6,092,960 A | 7/2000 | McCallion | |
| 6,171,016 B1 | 1/2001 | Pauls et al. | |
| 6,197,395 B1 | 3/2001 | Van Vechten et al. | |
| 6,221,295 B1 | 4/2001 | Kaiser et al. | |
| 6,316,074 B1 | 11/2001 | Kaiser et al. | |
| 6,403,004 B1 | 6/2002 | Stecker | |
| 6,485,660 B1 | 11/2002 | Kaiser et al. | |
| 6,493,914 B2 | 12/2002 | Kaiser et al. | |
| 6,517,277 B2 | 2/2003 | Hu et al. | |
| 7,632,037 B2 | 12/2009 | Brinkman | |
| 8,206,059 B1 | 6/2012 | Southgate et al. | |
| 8,413,396 B2 | 4/2013 | Oliva et al. | |
| 2005/0123374 A1 | 6/2005 | Thorning | |
| 2008/0261042 A1 | 10/2008 | Brandstrom | |
| 2010/0031607 A1 | 2/2010 | Oliva et al. | |
| 2012/0066994 A1 | 3/2012 | Gibson et al. | |

OTHER PUBLICATIONS

"Composite Rebar Manufacturers". 1p.
"TUF-BAR TM Fibreglass Rebar", Composites Ltd., 2pp.
"Pultrall V ROD". 1p.
"The Solution for Corrosion", V ROD. 6pp.
"Fiberglass Reber", Asian FRP Hughes Brothers. 4pp.
"Glass Fiber Reinforced Polymer (GFRP) Rebar" Aslan 100 by Hughes Brothers. 2007. 12pp.
"RockBar Corrosion resistant basalt fibre reinforcing bars", MagmaTech. 2pp.
"Fibreglass (GFRP) Rebar Infrastructure Applications", Composites Ltd. 34pp.
"FiReP GRP Bolts Bolting Systems for Mining and Tunneling". 12pp.
"FiReP(R) Product Brochure". 20pp.
"Technical Information Schock Combar(R)", Mar. 2006. 23pp.
"C-BAR Product Guide Specification", Marshall Composite Systems, LLC. 10pp.
"Specification for Carbon and Glass Fiber-Reinforced Polymer Bar Materials for Concrete Reinforcement, an ACI Standard", American Concrete Institute. 10 pp.
"TBM Launch & Reception Soft Eye Openings", Aslan FRP. 12pp.
"Carbon Fiber Reinforced Polymer (CFRP)", Aslan 200 by Hughes Brothers. 7 pp.
"FRPDistributors.com Home Page". 3pp.
"GFRP Rebar Specifications". 6pp.
"GFRP vs. Steel". 27pp.
"Hughes Brothers Website Notes:" 13pp.
"Fibre reinforced composite". 2pp.
"Products Features Unique to TUF-BAR TM fibreglass rebar". 8pp.
Canadian Intellectual Property Office, Office action regarding Canadian Patent Application No. 2,849,375, Mar. 26, 2015, 3 pages.
U.S. Patent and Trademark Office, Office action regarding U.S. Appl. No. 14/447,496, Feb. 13, 2015, 21 pages.
U.S. Patent and Trademark Office, Office action regarding U.S. Appl. No. 14/447,513, Feb. 13, 2015, 15 pages.

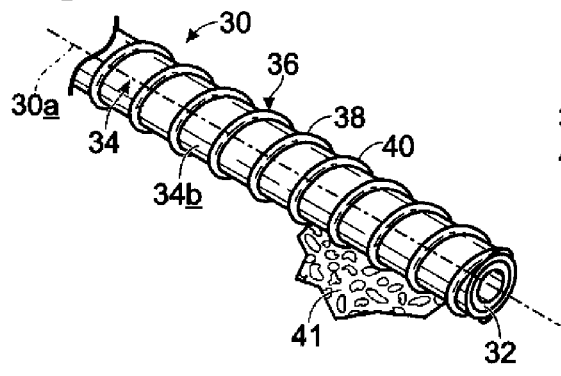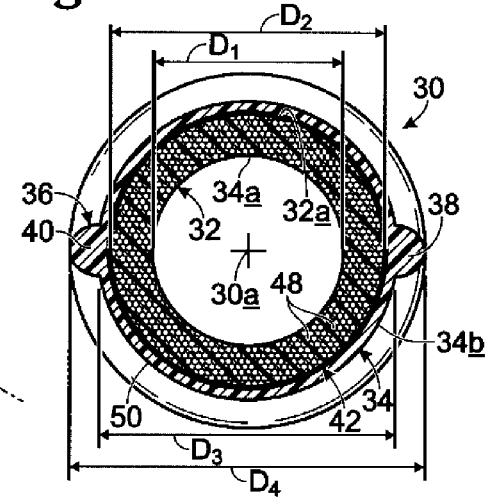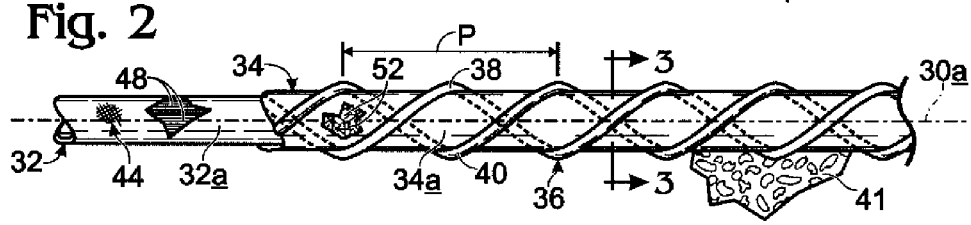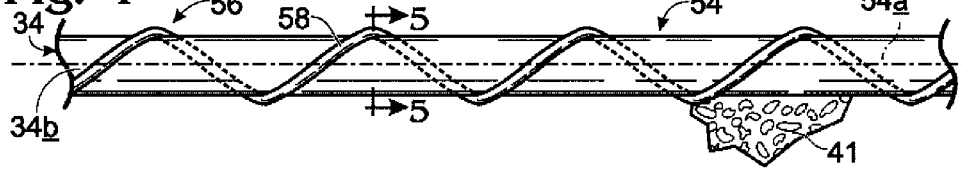

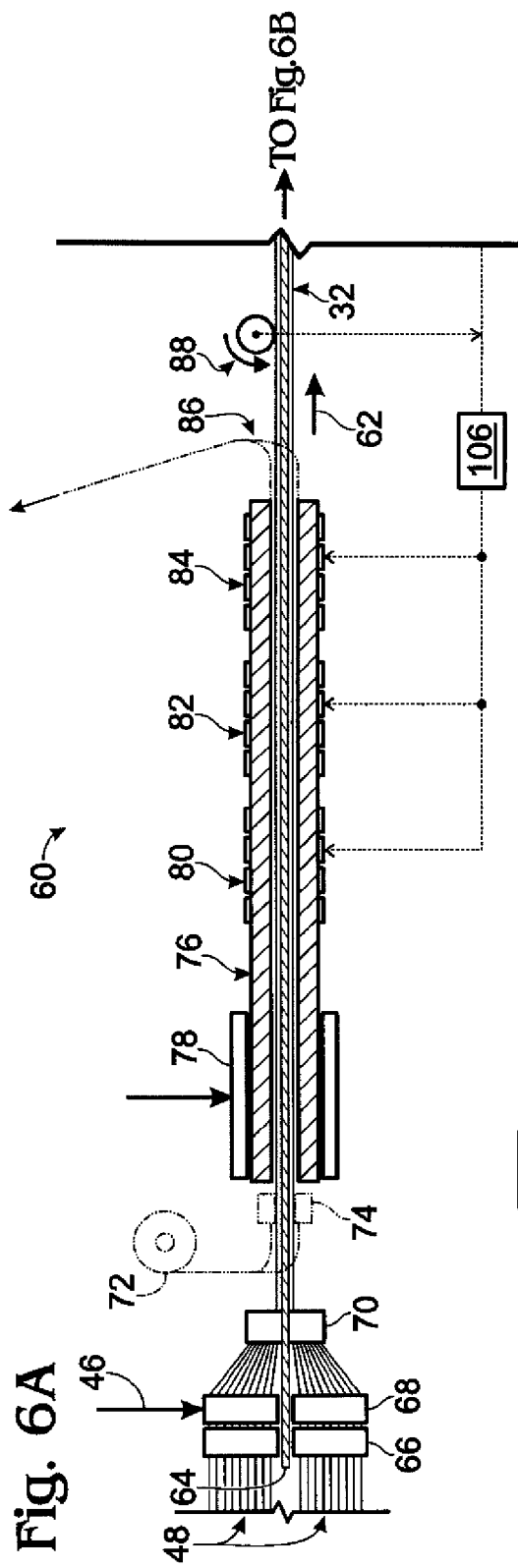
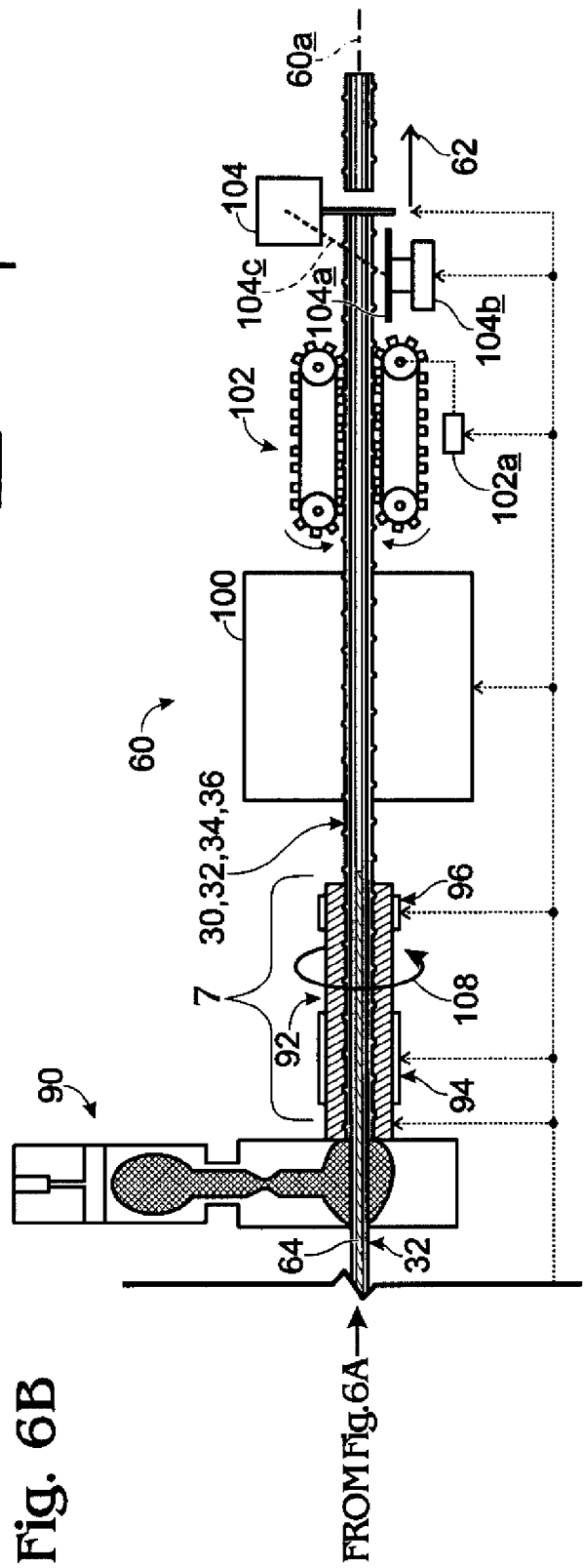

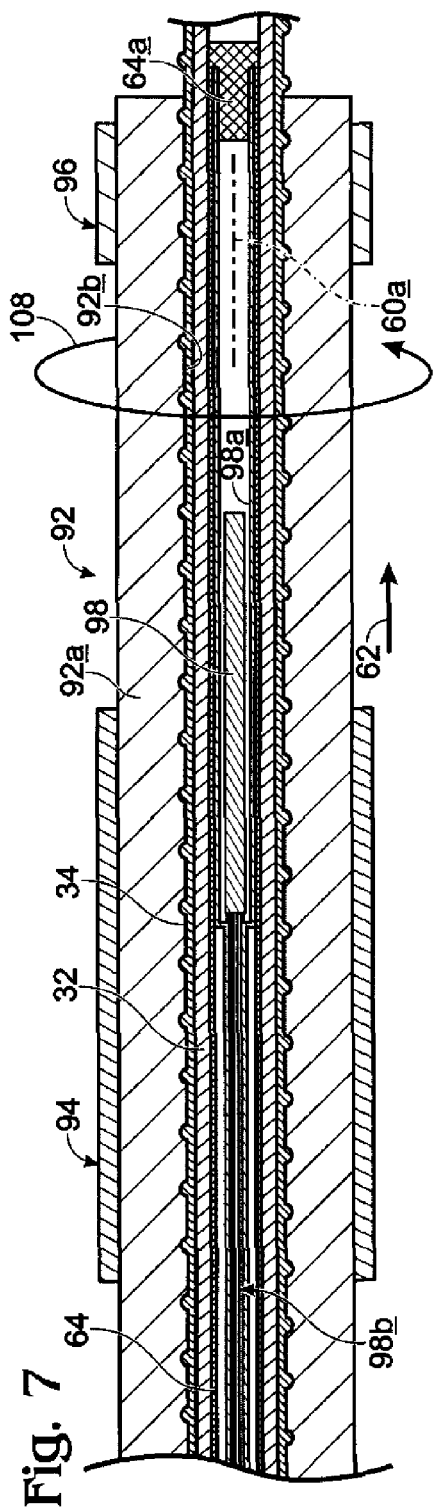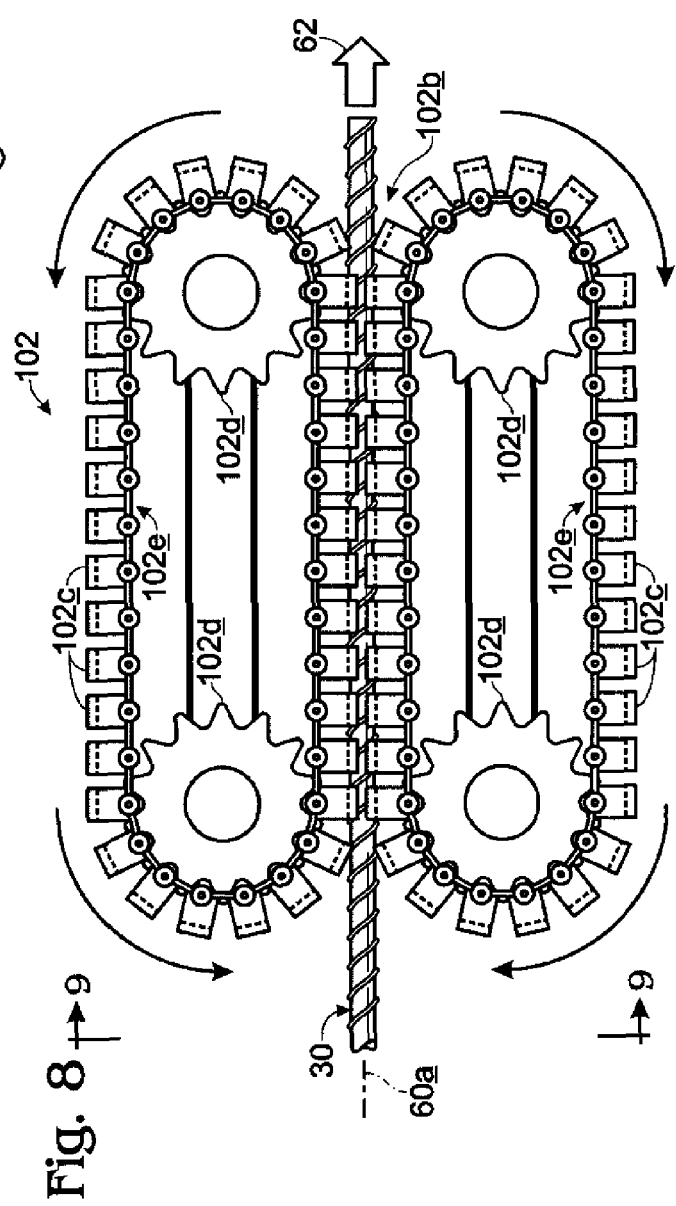

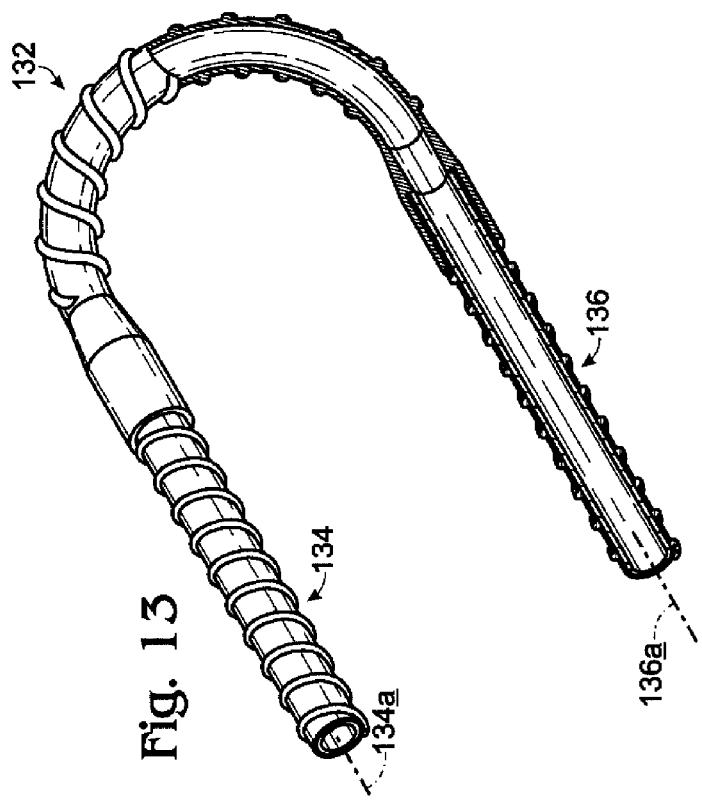
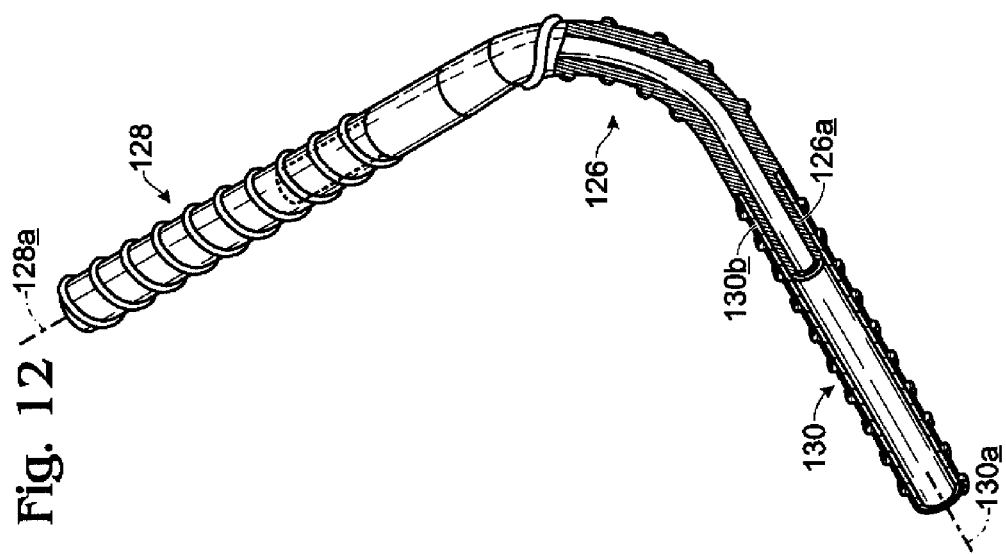

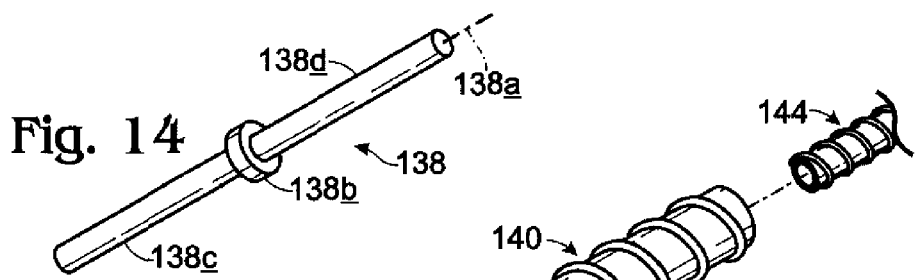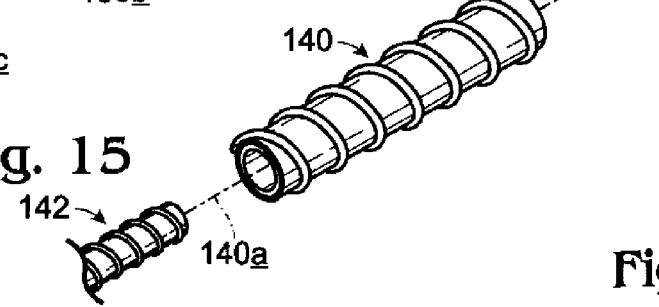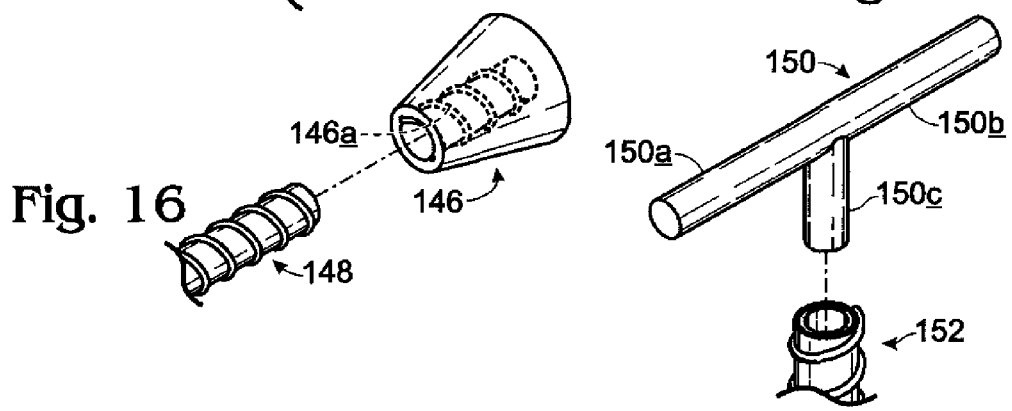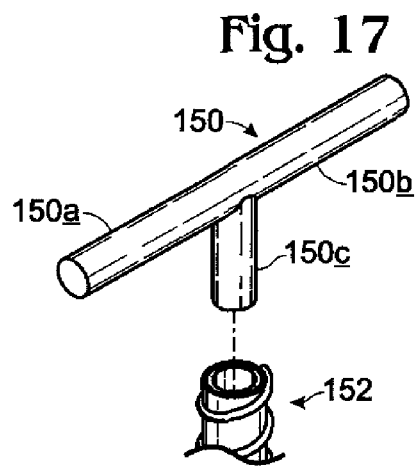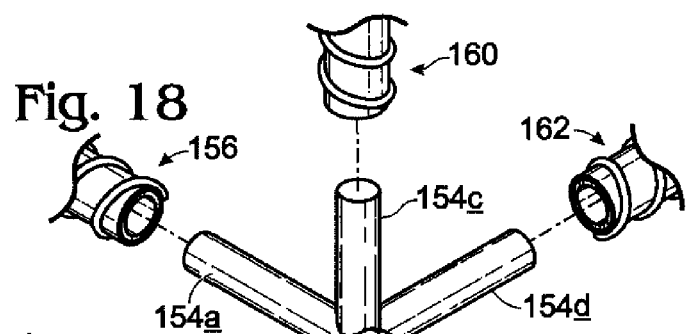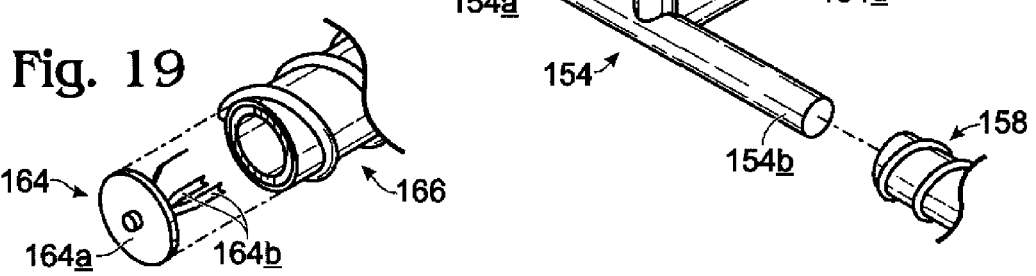

HOLLOW, COMPOSITE-MATERIAL REBAR STRUCTURE, ASSOCIATED COMPONENTS, AND FABRICATION APPARATUS AND METHODOLOGY

CROSS-REFERENCE TO RELATED APPLICATION

This application claims filing-date priority to U.S. Provisional Patent Application Ser. No. 61/385,502, filed Sep. 22, 2010, for "Hollow Composite Rebar and Associated Structure and Methodology", the entire disclosure content in which is hereby incorporated herein by reference.

BACKGROUND AND SUMMARY OF THE INVENTION

This invention pertains (a) to hollow, composite-material, rebar structure, also referred to as hollow, composite, core/sleeve rebar structure, and as well (b) to methodology for making this structure, (c) to apparatus which implements the making methodology, and (d) to a system employing the invented rebar structure, and featuring various rebar-to-rebar coupler (or coupling), and other specialized fitting, components.

In particular, and with respect to the just-mentioned, core/sleeve rebar structure, per se, the invention focuses upon a unique arrangement which includes (a) a central, circularly cylindrical, elongate, hollow core formed by pultrusion (in a pultrusion die) from a thermoset plastic resin (preferably urethane-modified vinyl ester) which embeds a plurality of elongate, substantially linear, long-axis-tension-carrying-capable, reinforcing fibers, preferably made of e-glass, and (b) a jacketing, i.e., circumsurrounding, specially, molecularly-joined, circularly cylindrical, elongate, hollow, thermoset plastic-resin sleeve that is formed, in a rotational, transfer-molding die, preferably employing the same thermoset-plastic, urethane-modified vinyl ester resin (or another, compatible thermoset resin material) which is used in the core, and which jacketing resin embeds a plurality of randomly distributed, randomly oriented, "chopped" (i.e., short, typically 1/32-1/2-inches) reinforcing fibers, preferably made of carbon or basalt. The sleeve material, in particular, preferably takes the form of conventional, i.e., well-known, bulk-molding-compound (BMC) material which has the character just generally described, and which has been found to be well suited for the sleeve portion of the invention. This sleeve, in an operative, structural-incorporation setting for the overall rebar structure in a body, or mass, of surrounding concrete, via the included, multi-directionally oriented, short fibers, responds, as it seems, "multidirectionally", by "gathering" the surrounding environmental, concrete-borne forces and directing them effectively into the long, linear, axially extending, tension-capable fibers present in the hollow core.

Created integrally with and as a part homogeneously of the preferred, BMC-material sleeve, on and along its outside surface, is an outwardly radially projecting, "purchase-enhancing", elongate ridge structure in the form, preferably, of continuous elongate, double-helix winds which, under circumstances with the completed rebar structure viewed in side elevation, present the appearance of evenly spaced screw threads. Other forms of purchase-enhancing structure may, of course, be employed, if desired.

Lying in the background of, and furnishing an underpinning basis for, the creation and development of the present hollow, composite-material rebar invention are certain comparative-advantage, and also difficulty, issues that have been, and that continue to be, experienced differentially in the conventional, predecessor fields involving both long-standing, traditional steel rebar, and more recently, solid, composite, or composite-material, rebar. Steel rebar has, of course, been utilized in infrastructure-reinforcing settings for decades, and solid, composite rebar has now been available and in similar use, for example in the United States, for many (but fewer) years. Solid, composite rebar's generally successful use in various projects implemented during these later years in various types of infrastructure installations has led to its approval for use now in a variety of concrete structures, and the present invention is squarely aimed at offering significantly improved, composite-material rebar structures that enhance its utility in this field.

As those knowledgeable in the art are aware, solid, composite rebar, now conventionally available, offers a number of advantages (with only a few drawbacks) over conventional steel rebar. Non-exhaustively expressed, these advantages include (a) longer-life tolerance against functional and structural degradation—degradation relating to interactive presence in certain environmental, concrete-surround conditions, (b) avoidance of induced proximity damage to surrounding, contacting concrete, (c) low negative impact (resulting from (b)) on the "outside" environment (explained below), and (d) materials-handling, etc. cost savings.

Regarding such advantages, while composite rebar use, in comparison with steel rebar use, in typical concrete infrastructure applications, such as in roads, bridges, tunnels, airport runways, levies and parking decks, clearly offers the benefit of lower transportation and material-handling costs due to the fact that composite rebar material is only about one-quarter the weight of equivalent-diameter steel, its main economic appeal, associated with others of the above-stated advantages, is its ability, through avoiding structural degradation, dramatically to extend the life of a concrete structure in which it has been incorporated. More specifically, concrete structures that are built with steel rebar (either plain or epoxy coated) ultimately fail, and sometimes catastrophically, due to surrounding-environment-induced corrosion of the included rebar. As such rebar corrodes, it not only weakens and loses reinforcement capability, but more seriously, it expands substantially, and essentially "blows apart" the surrounding concrete mass (an event commonly known as spalling concrete, or crumbling infrastructure). "Mending" of such "from the inside" structural damage is typically neither simple nor inexpensive. Rather, repair usually dictates the need for complete structural replacement.

Composite rebar does not cause this kind of problem.

This "does not cause" statement can fairly be made even though there are certain "composite rebar" circumstances wherein some rebar degradation may occur, typically via slow, progressive, alkaline damage to "unshielded glass fibers" often employed as embedded, reinforcing inclusions in concrete-containing composite rebar. Such damage, however, does not produce the dramatically disruptive "blow-apart" phenomenon mentioned above associated with decaying, concrete-held, steel rebar.

Composite rebar use therefore provides a dramatic, and strikingly measurable, advantage when compared to steel rebar use in concrete construction; and while that advantage is, as just outlined, primarily a cost saving advantage due to the extended life consideration for a utilizing project, there is another substantial, and related, benefit which involves an important environmental consideration.

Concrete is perhaps the most ubiquitous building material in the world. It works well, is relatively inexpensive, and is readily available. When a structure fails, as just above described, due to corroding steel rebar, replacement structure must be created with new concrete for the reason that the cement component in concrete cannot be recycled. With this in mind, and recognizing that cement-making, as an industry, generates, and releases into the atmosphere, a significantly high contribution of $CO_2$, minimizing concrete usage as much as possible is a very real concern and intention. It will, accordingly, be evident that the use of composite, instead of steel, rebar in concrete structures successfully addresses this concern by deferring, or even eliminating, the need to replace old rebar-reinforced concrete with new.

While, therefore, solid, composite rebar thus distinguishes itself favorably and advantageously in many ways over traditional steel rebar, it also, as was briefly suggested above, exhibits certain drawbacks that result principally due to its "solidness"—limitations which, importantly, are now successfully addressed by the features of the present, "hollow", two-main-component core/sleeve, composite rebar invention, shortly to be more fully discussed. Notable among the recognized limitations of solid rebar is the so-called "size effect", or "shear lag", issue which becomes evident as the overall outside diameter of such a rebar is increased in the context of offering, or so it is hoped, "more robust" rebar reinforcement in certain applications. The terms "size effect" and "shear lag" will hereinafter be employed interchangeably. Such a rebar diameter increase, unfortunately, and as is well understood by those skilled in the art, causes the core region of a conventional solid, composite rebar progressively to lose core-area efficiency in terms of strength and load handling due to early, differential catastrophic failures that occur in the outer core-reinforcing fibers. Moreover, as the diameter size of traditional, solid, composite rebar increases, so also do the attendant, material-volume usage, and the associated, material-end-product cost. Thus, the "shear-lag" problem confronts traditional composite rebar-usage designers with the dilemma that an increase in rebar diameter size to achieve hoped-for greater reinforcing strength leads to the combined negative effects of (a) an actual, non-proportional (i.e., less than directly following) core-strength increase, and (b), increased material usage and cost.

As will become apparent, the hollow, composite-material, core/sleeve rebar structure which is proposed by the present invention, while retaining all of the important advantages offered by conventional, solid, composite rebar, both significantly addresses, correctively, the solid rebar limitations just mentioned, and at the same time introduces important additional advantages.

The apparatus offered and employed by the invention to make the proposed new hollow rebar structure, and the associated making methodology, collaboratively contribute significantly to the enhanced structural and performance capabilities of the subject, invented rebar structure.

Additionally, the systemic features of the invention which center on employment of the invented hollow rebar structure offer a number of impressive infrastructure installation and use advantages of the invention in a structural concrete mass.

More elaborations about these new features and advantages are presented now immediately below in the respective summary descriptions of the several principal facet-aspects of the invention, as well as later on in the detailed description of the invention.

Hollow, Composite, Core/Sleeve Rebar Structure

According to a preferred and best-mode embodiment of the invention, what is proposed, from a structural, product point of view, is an elongate, composite-material (thermoset plastic and elongate, liner, reinforcing fibers), hollow rebar structure having a long axis, and including, (a) an elongate, hollow, pultrusion-die-formed core centered on that axis and possessing an outer surface, (b) an elongate, hollow, rotationally-transfer-die-molded sleeve having inner and outer surfaces, circumsurrounding, and bonded via its inner surface to, the core's outer surface along the core's length, and (c) longitudinally distributed, radial-dimensionality, external-purchase-enhancing structure formed unitarily and homogenously, in the same rotational transfer-molding process employed for the sleeve, with and along the length of the sleeve's outer surface. Preferably, though not necessarily, the core and sleeve are circularly cylindrical, and the purchase-enhancing structure takes the form of a pair of elongate, continuous, double-helical winds projecting radially outwardly from and along the sleeve's outer surface. It is this condition of radial, outward projection of the helical winds, relative to the outer surface of the sleeve body, which is what is meant by the phrase "radial-dimensionality".

Rebar hollowness, and the setting of the bonded, core/sleeve combination which centrally defines the rebar structure of the present invention, collaborate to offer some surprising and significant performance advantages over all known rebar structures, including certain unique load managing and handling advantages.

Importantly, the bond existing between the core and sleeve, according to preference, takes the form of a single-cure, dual-plastic-material (formed combinationally by that plastic resin material present in the core and that also present in the sleeve), molecular bond, and in a more particular sense, what is referred to herein as a dual-plastic-material, reverse-temperature-gradient-cure, molecular bond —a bond which has resulted from a single, plastic-curing procedure driven by an appropriate temperature gradient defined (a) by a higher temperature created and existing in the central, hollow interior of the core within the rotational transfer-molding die which homogeneously forms the sleeve and the purchase-enhancing structure, and (b) by a suitably lower temperature created immediately outside the core-circumsurrounding sleeve through the wall of the rotational transfer-molding die.

An assisting, and optionally additional, mechanical bond, based chiefly upon appropriate, pre-bonding surface roughening of the outer surface of the pultrusion-formed central core, may also be employed.

In the proposed, preferred-embodiment rebar structure, the core is formed of a thermoset-plastic-resin-containing embedded, elongate, continuous, reinforcing fibers, preferably e-glass, and the sleeve and the purchase-enhancing structure are formed, as mentioned above, of a compatible, thermoset-plastic-resin which contains embedded, randomly-ordered, chopped (short), reinforcing, and preferably carbon fibers. The preferred sleeve material, generally speaking, takes the conventional form of what is known as bulk-molding-compound (BMC) material, wherein the included, chopped fibers, in accordance with the present invention, are made of at least one of carbon (preferred) and basalt. BMC also variously contains other well-known ingredients, conventionally included, and is not therefore discussed in any greater detail herein. We recognize that those skilled in the relevant art will readily choose an appropriate, specific BMC mix, or blend, to invoke their implementations of the present invention.

A proposed, modified form of the rebar structure of the invention, illustrated and discussed herein, is describable as being an elongate, hybrid, rebar structure having a long axis, and including an elongate, composite-material, hollow core featuring (a) a hollow interior centered on that axis, and an outer surface, (b) an elongate rigidifier (such as a steel bar) load-bearingly and cooperatively received within the core's hollow interior, and (c) an elongate, composite-material, hollow sleeve having inner and outer surfaces, circumsurrounding the core along the core's length, with the sleeve's inner surface bonded to the core's outer surface along the length of the latter.

The sleeve, per se, in the rebar structure of the invention is independently expressible as being a jacketing structure for an elongate, hollow-rebar, central core having a long, core axis, with the sleeve possessing (1) an elongate, hollow body formed with a long axis, (2) a hollow interior (in its body) which is adapted to receive, bondedly, such a core in a manner wherein the two, mentioned long axes are substantially coincident, and (3) an outside surface on the sleeve body which includes, distributed along its length, unitarily formed, longitudinally distributed and extending, radial-dimensionality, external-purchase-enhancing structure.

The proposed rebar structure essentially offers all of the advantages of conventional, solid, composite rebar over steel rebar, as mentioned above, while at the same time (a) avoiding the drawbacks which have been associated with such predecessor composite rebar, and in fact (b), introducing several new advantages over all known, conventional rebar structures.

For reasons not completely understood, and which have surprised us, it turns out to be a fact that the overall rebar structure of the present invention, and which is hollow, both in its core, and in its included, core-circumsurrounding sleeve, turns out substantially to avoid, or at least greatly to minimize, the negative "size effect" issue which is presented by solid, composite rebar structure. The central core which, as mentioned, includes elongate generally linear embedded (preferably e-glass) fibers has been found to provide superior tensile load-handling characteristics without any appreciable introduction of a "size effect" problem. These fibers, of course, extending as they do along the long axis of the core, are oriented most appropriately for handling expected high tensile loads when the rebar structure of the invention is placed in operative condition within a surrounding mass of concrete.

The surrounding sleeve, which includes short-length, randomly oriented and distributed fibers of a different material character (preferably carbon, or alternatively basalt), and which typically (in use) resides within the alkaline environment of surrounding concrete, does not exhibit fiber degradation on account of that environment; and, because of its circumsurrounding and jacketing disposition with respect to the inner hollow core to which it is bonded, guards that core, and specifically the preferred e-glass fibers in that core, against degradation-producing exposure to direct contact with the surrounding alkaline "world" of concrete. Additionally, the random-orientations of the short fibers which characterize the construction of the core-jacketing sleeve function extremely effectively, and surprisingly, as we have learned, in private and confidential testing, to "gather" and direct into the linearly extending elongate fibers in the core, the various appropriate vector components of forces which develop in a surrounding mass of load-bearing concrete.

The fact that the proposed hollow rebar structure effectively is made up of two, principal tubular components —components which differ from one another chiefly in the nature of the material used in the included reinforcing fibers—thus characterizes a combined, overall structure which not only survives well within an alkaline, concrete environment wherein it is employed, but also uniquely functions both (a) to gather, and transmit (via multi-directionally oriented fibers) very effectively into the central core, surrounding forces so as to produce noticeably superior tensile load handling (via elongate, substantially parallel linear fibers) within the core, and (b) to do this in a setting wherein "size effect" difficulties that are associated with "differently sized and different-strength" rebar structures have not appreciably materialized. The differential-material characters of the fibers in the sleeve and the core produce a "best of many worlds" behavior for the proposed rebar structure, with the included fibers in each of these two, collaborating structural components functioning most appropriately in their respective "rebar settings".

In connection with the just-mentioned, important, "different-strength", non-problematic "size effect" consideration, an extremely interesting feature of the hollow rebar structure of present invention is that, while various outside, overall sleeve diameters may be created effectively to furnish a range of nominal, staged-strength rebar sizes, it turns out to be the case that for a given rebar structure with a particular outside sleeve diameter, merely by changing alone the wall thickness of the internal core, an interesting range of differed rebar strength sizes is attainable. Not only is this feature of the invention by itself interesting, beyond this "rebar-internal" feature, within a given structural-use environment involving a particular, set-outside-dimension mass of concrete, and without in any way diminishing, or otherwise altering, the volume (the internal content) of that mass (which possesses its own pre-design, load-carrying capacity) to accommodate differences in the outer diameter of intended, embedded reinforcing rebar structure, simply by changing wall thickness of the included, inside, tubular core in the rebar structure of the present invention, there are available different, rebar-strength-reinforcement choices for such a concrete mass.

Put another way, the present invention, by allowing for effective rebar strength changes simply through changing wall thickness in the included inside core, without changing outside diameter dimensions of the sleeve, effectively makes the changing of rebar "strength sizes" independent of surrounding, pre-design mass dimensions of concrete. In this context, one will note that, with conventional solid, composite, or steel, rebar structure, and for a given-outside-dimension mass of concrete, a diameter change in the outside dimensions of such rebar structure automatically requires a change in the surrounding volume of the, pre-dimension-determined, given mass of concrete, with more concrete being employed with smaller-diameter rebar structures and less concrete being employed to accommodate larger-diameter rebar structures. This, of course, is a situation in which surrounding concrete mass, for a given, desired, set of outside dimensions, is not independent of rebar "size strength".

Another feature of the hollow rebar structure of the present invention is that it offers, for useful and innovative employment, the internal, hollow, central channel for the "routing", for example, of various kinds of infrastructure possibilities like cabling or fluid conveyance (such as for controlling anti-freezing of bridge surfaces), as well as the selective introduction of protected (i.e., shielded), additional strengthening elements, such as inserted steel bars, if desired. Additional creative use of the hollow aspect of the rebar structure of the present invention might include the installation therein of various types of information-generating sensors to improve utilization of a rebar-reinforced structure, for example for optimizing traffic flow on bridges, for monitoring use-history in order to schedule maintenance more effectively, for monitoring load management, and for other things.

Rebar-Making Methodology

From one methodologic point of view, the methodology of the invention may be expressed as a method of making an elongate, composite-material, hollow rebar structure including the steps of (a) forming an elongate, composite-material, hollow core, (b) in association with such forming, preparing along the core's length an elongate, composite-material, core-circumsurrounding, hollow sleeve having inner and outer surfaces, (c) in association with such preparing, creating, unitarily with the sleeve, and in a manner distributed along the length of the sleeve's outer surface, an external-purchase-enhancing structure possessing radial-dimensionality, and specifically in the form of a pair of elongate, continuous, generally helically paralleling winds extending along the length of the sleeve's outer surface, and (d) bonding the inner surface of the sleeve to the outer surface of the core. Preferably, this methodology is carried out in manners whereby the core-forming step is performed by pultrusion, and the preparing and creating steps are implemented by continuous transfer-molding within a rotational die.

In this methodology, bonding is implemented preferably in a manner which establishes between the core and sleeve a bond in the form of a single-cure, dual-plastic-material molecular bond, and in the more particular sense expressed above herein, what is referred to herein as a dual-plastic-material, reverse-temperature-gradient-cure bond as generally described. Such a bond, and particularly the reverse-temperature gradient, single-cure aspects of it, play(s) an important role in the performance of the present invention in many applications.

As mentioned also above, a mechanical bond may be implemented.

From another point of view the invention methodology may be described as a method of making an elongate, composite, hollow rebar structure featuring (a) forming, in a pultrusion die, an elongate, composite-material, fiber-reinforced, curable-plastic-material-including, hollow core, (b) applying heat within the pultrusion die to create, for the core's included plastic material as it emerges from the die, an outer-surface plastic condition which is less than 100% cured, (c) in association with, and downstream from, the forming step, preparing, in a rotational, continuous-transfer-molding die, on the less-than-100%-cured, outer-surface plastic of the emerging core and along its length, an elongate, hollow, composite-material, fiber-reinforced, curable-plastic-material-including, core-circumsurrounding sleeve, (d) in relation to such preparing, and within the transfer-molding die, creating, unitarily with the sleeve, and in a manner distributed along the length of the sleeve's outer surface, an external-purchase-enhancing structure possessing radial-dimensionality, and (e) within the transfer-molding die, applying heat to effect between the plastic material in the core and that in the sleeve a single, reverse-temperature-gradient-cure, plastic-material bond.

The unique, two-component, core/sleeve structure of the present invention is especially accommodated by, and in relation to, the just-above-outlined methodology of the invention which involves the under-curing of plastic resin material during the core-forming pultrusion process—an under curing procedure referred to as B-staging which assures that, as the formed core emerges from the pultrusion-forming die, the surface condition of the resin in that core has enough of a temporarily-lasting, under-cured condition so that subsequent bonding, as will later be explained herein, with the inner surface of the about-to-be-downstream-formed sleeve takes place in a very robust manner.

Other manners of characterizing the methodology of the invention will become apparent in the detailed description of the invention presented later herein.

Apparatus for Implementing Methodology

The present invention, as mentioned above, also proposes special apparatus for carrying out the methodology of the invention in order to produce the rebar structure of the invention.

Thus, it offers apparatus for making an elongate, composite-material, hollow rebar structure, such apparatus having a long, rebar-formation axis, and upstream and downstream regions disposed at spaced locations on and along that axis. The proposed apparatus, progressing therein, and therealong, from the upstream region toward the downstream region, includes (1) an elongate, hollow mandrel having a long axis which is substantially coincident with the rebar-formation axis, extending from adjacent the upstream region toward adjacent the downstream region, (2) an elongate, hollow pultrusion die disposed operatively adjacent the upstream region, having a long axis which is substantially coincident with the rebar-formation axis, circumsurrounding the mandrel, and operable to form an elongate, composite-material, hollow core in the region disposed between itself and the mandrel, and (3) an elongate, hollow, transfer-molding die disposed downstream, and spaced, from the pultrusion die, having a long axis about which it is rotatable and which is substantially coincident with the rebar-formation axis, the transfer-molding die being operable to form, along the length of a core which has been formed upstream by the pultrusion die, (a) an elongate, composite-material, core-circumsurrounding, hollow sleeve having an outer surface, and (b), unitarily with the sleeve, and in a manner distributed along the length of the sleeve's outer surface, an external-purchase-enhancing structure possessing radial-dimensionality.

The apparatus of the invention, as just generally described, further includes plural heaters distributed in spaced relation with respect to one another along the rebar-formation axis, and disposed in operative adjacency relative to, and association with, the pultrusion and transfer-molding dies. These heaters uniquely feature special, internal heating structure which is disposed within the above mentioned hollow mandrel where it extends through and within the transfer-molding die—this internal heater being operable to produce a "reverse", radially outwardly directed (relative to the rebar-formation axis) heat gradient.

The importance of this feature in creating a robust core-sleeve bond has been mentioned above.

Additionally included in the apparatus of the invention is a power-driven puller disposed downstream along the rebar-formation axis in spaced relation to the transfer-molding die, operable to pull a forming rebar through the dies in a downstream direction along the rebar-formation axis under the influence of a drive motor. This drive motor operates the puller at a speed which moves a forming rebar along the rebar-formation axis at a rate relative to the pultrusion die and to the heaters which are operatively associated with that die whereby the outer surface of plastic material in core structure emerging downstream out of the pultrusion die, and later entering the transfer-molding die, is, and remains during transit between the dies, in a less-then-100% cured condition.

Hollow, Composite-Rebar Systemic Features

The present invention, in addition to all of the above, further proposes a system expressible as including (a) first and second, elongate, hollow-interior, composite-material rebar elements having ends, and (b) a composite-material coupler disposed between, anchored to, and joining a pair of adjacent ends in these elements. These system elements have respective long axes, and the coupler orients these element axes in a condition of nonalignment relative to one another.

In a more particular sense, the hollow interiors of the elements communicate with the elements' ends which are open, and the coupler is elongate, and possesses along its length a double-open-ended hollow interior which communicates with the hollow interiors in the elements. The coupler is anchored to the elements via receiving, or being inserted into, the elements' ends.

From another systemic perspective, the invention may be described as a composite-material rebar system which includes an elongate, composite-material rebar element, and a defined-function fitting joined to that element. Fittings proposed include angular rebar joiners (couplers), plugs, T-type rebar links, and many others described below herein. Fittings may be positionally-adjustably joined to system rebar elements.

These and various other features and advantages of, and offered, the present invention will become more fully apparent as the detailed description of it below is read in conjunction with the accompanying drawings and the appended claims.

DESCRIPTIONS OF THE DRAWINGS

FIG. 1 is a fragmentary, isometric view illustrating a preferred and best-mode embodiment of a hollow, elongate, composite-material rebar structure, or rebar, which includes a core, a circumsurrounding/jacketing sleeve, and on the outside of the sleeve, radial-dimensionality, external-purchase-enhancing structure in the form of a pair of evenly spaced, dual, helical winds, all made in accordance with the present invention.

FIG. 2, which is drawn on about the same scale employed in FIG. 1, is a fragmentary side elevation of the rebar structure of FIG. 1, with a portion of the jacketing sleeve removed.

FIG. 3 is a larger-scale, cross-sectional view taken generally along the line 3-3 in FIG. 2.

FIG. 4 is a fragmentary side elevation, somewhat like that which is presented in FIG. 2, and drawn on about the same scale, illustrating a modified form of the rebar structure of the invention—this modified form differing from that of the rebar structure of FIGS. 1-3, inclusive, in relation to the specific configuration of the included, helical (here, a single wind) radial-dimensionality, external-purchase-enhancing structure.

FIG. 5 is a cross-sectional view, drawn on approximately the same scale as that used in FIG. 3, taken generally along the line 5-5 in FIG. 4.

FIGS. 6A and 6B are laterally linkable split views collectively (when linked) presenting a simplified, schematic, overall, partly cross-sectional side-elevation of linearly-deployed apparatus made in accordance with the invention employed in the manufacture of rebar structures like those pictured in FIGS. 1-5, inclusive. This split-illustrated apparatus is commonly disposed along what is referred to herein as a long, rebar-formation axis which is represented by a dash-dot line appearing adjacent the right side of FIG. 6B. Interconnected, dashed lines, with eleven, attached arrowheads, represent an operational-control interconnection existing between (1) various heaters, (2) a speed encoder, (3) a rotational transfer-molding die, (4) a final resin-curing oven, (5) a puller drive motor, and (6) components in a chop saw mechanism that are distributed along the length of the pictured apparatus.

FIG. 7 is an enlarged, fragmentary, side-picturing cross section, taken generally in the region embraced by the bracket numbered "7" in FIG. 6B, showing in somewhat greater detail the rotational transfer-molding die region in the apparatus of FIGS. 6A, 6B.

FIG. 8, which is drawn on a somewhat smaller scale than that employed in the FIG. 7, presents a fragmentary side-elevation of a "crawler-tractor-style" puller which is included in the apparatus of FIGS. 6A, 6B.

FIG. 9, presented on about the same scale used in FIG. 8, is a fragmentary view, rotated 90-degrees counterclockwise, taken generally along the line 9-9 in FIG. 8.

Figure 10:
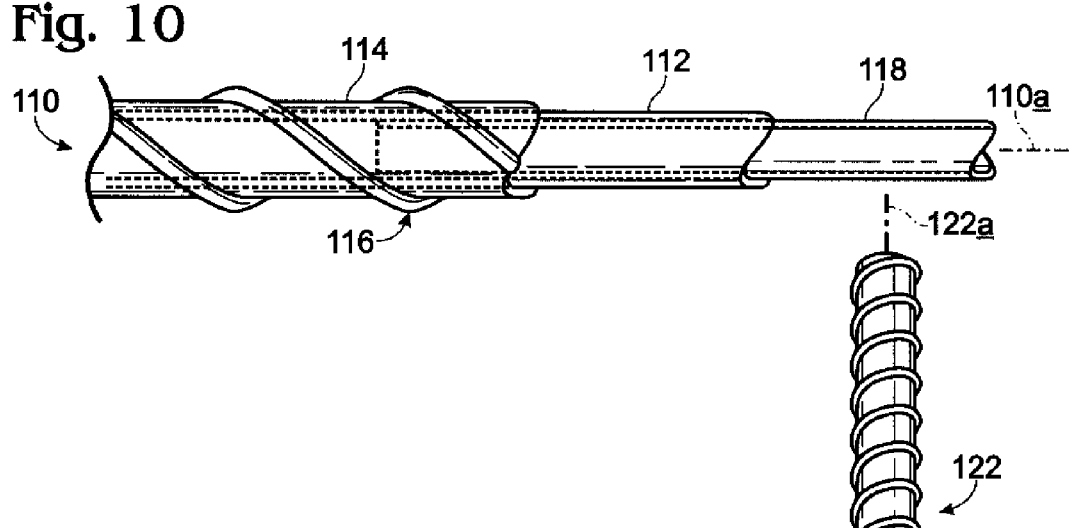

FIG. 10 illustrates a modified, hybrid form of the rebar structure of the invention.

FIGS. 11-19, inclusive, illustrate various different forms of couplings, connections and fittings that may be employed with the rebar structure of FIGS. 1-5, inclusive, in a systemic version of the present invention.

Various components, structures and component arrangements (dispositions) that are shown in these drawing figures are not necessarily drawn with precision accuracy, or to scale with respect to one another.

DETAILED DESCRIPTION OF THE INVENTION

Turning now to the drawings, and referring first of all to FIGS. 1-3, inclusive, indicated generally at 30 is an elongate, linear, composite-material, hollow rebar, or rebar structure, constructed in accordance with a preferred and best-mode embodiment of the present invention. Rebar 30, which has a long axis seen at 30a, includes an central, hollow, circularly cylindrical, composite-material pultruded core 32, to the outer surface 32a of which is bonded the inner surface 34a, of the main body of a hollow, circularly cylindrical, composite-material, rotationally transfer-molded sleeve 34. Formed integrally and homogenously with the sleeve's main body, and disposed on, and along the length of that body's outer surface 34b, is what is referred to herein as radial-dimensionality, external-purchase-enhancing structure 36, also referred to herein as helical ridge structure. Ridge structure 36, in the preferred embodiment of the invention which is now being described, includes a pair of evenly spaced, continuous, parallel, helical winds 38, 40 that project radially outwardly from the sleeve body's outer surface relative to rebar axis 30a. This ridge structure plays the evident role of furnishing excellent, longitudinal-positional-stability purchase for the rebar when it is in place within a body of surrounding concrete, such as that shown fragmentarily at 41 in FIGS. 1 and 2.

The main, central, cylindrical body of sleeve 34, along with ridge structure 36 formed by winds 38, 40, are referred to herein collectively as a hollow-interior jacket, or jacketing structure.

Looking specifically at FIG. 3, the heavy, darkened, circular line which is indicated at 42, and which lies at the interface between core 32 and sleeve 34, represents the above-mentioned, surfaces 32a/34a bond that exists between the core and sleeve portions of rebar 30—a very special bond which takes the form herein of what is referred to as a single-cure, reverse-temperature-gradient-cure, plastic-material, molecular bond which becomes created, as will later be explained, during the process of fabricating sleeve 34 over, around and along the length of core 32. Bond 42 is also referred to herein as a bonding structure.

In certain instances, bond 42 may be enhanced to have certain, additional mechanical characteristics, as, for example, by the presence of a roughened-surface interface prepared, as will be explained later herein, on surface 32a of core 32 prior to formation of sleeve 34 around the core. Accordingly, indicated generally by a small cross-hatched surface marking 44 in FIG. 2 is a small patch which represents the modification alternative of including such a roughened surface texture.

As was mentioned above, core 32 is a pultruded structure. It is formed of a suitable thermoset plastic resin, preferably such as urethane-modified vinyl ester, in which are embedded plural, elongate, preferably e-glass fibers whose long axes substantially parallel rebar axis 30a. The resin present in core 32 is indicated at 46 in FIG. 2, and the embedded fibers are indicated generally at 48 in FIGS. 2 and 3. In the preferred embodiment of the invention now being described, the core-embedded fibers occupy about 77% by volume of the core. While e-glass fibers are preferred in the core, other fiber materials, such as s-glass, basalt and carbon, may be used, if desired. No matter what core fiber is included, in the ultimate, traditional use environment of surrounding concrete, all potentially alkaline-sensitive material in the core is shielded from the typical alkaline, surrounding-environmental character of concrete by sleeve 34.

Sleeve 34, and the winds in ridge structure 36 are formed, as was generally mentioned above, by what is known as a continuous, transfer-molding procedure, and very specifically by such a procedure which is performed within a specially prepared rotational die that is cross-sectionally configured so as to produce not only the main body portion of the sleeve, but also the ridge-structure winds. This homogeneous sleeve and ridge-structure formation includes a mass of a suitable thermoset plastic resin, preferably the same as, i.e., common with, the already-mentioned urethane-modified vinyl ester resin in the core—importantly, a resin which, in any event, is compatible chemically and molecularly with the thermoset plastic resin used in the core, and, embedded in this sleeve-forming thermoset resin, a random-orientation, embedded distribution of very short, chopped (about ½-inches long) reinforcing carbon fibers which are oriented in multi-directions within the sleeve and ridge structure. The thermoset plastic resin material in the sleeve and ridge structure is indicated generally at 50 in FIG. 3, and the embedded, chopped fibers, which preferably occupy about 15% by volume of the sleeve and ridge structure, generally at 52 in FIG. 2. This sleeve and ridge structure is preferably formed by a generally conventional composition of what is known as bulk-molding-compound (BMC) which is prepared to include the mentioned thermoset resin and chopped carbon fibers. As was mentioned earlier herein, basalt is a good alternative to carbon as the chopped fiber content in the integrated sleeve and ridge structure.

Those skilled in the art will readily understand that the various dimensions of the component portions making up rebar structure 30 may have a relatively wide range of satisfactorily usable and different dimensions, depending upon the particular application for that structure.

Dimensional changes in the rebar componentry play a role, of course, in the design load-handling capability of that structure. The fact that the structure, as a whole, is a hollow structure, results in substantial elimination of what was described above as the so-called "rebar size effect issue" which characterizes conventional solid, composite rebar, often referred to as solid, FRP (fiber-reinforced-polymer) rebar. Accordingly, relatively large outside diameter (overall) rebar structures are thus producible and usable for high load-handling requirements without the diminution of capability that characterizes solid-cross-section rebar structures.

Very interestingly, in addition to the fact that the central, hollow interior of the proposed rebar core structure accommodates a number of infrastructure capabilities in, for examples, buildings, roadways, etc., installations, such as providing a passageway for the flow of different fluids, and for electrical, fiber optical and other cabling, as well as for accommodating the internal employment of information-yielding load sensors for reasons such as those suggested above herein, is the further fact that the load-handling capability of a particular rebar structure, without in any way changing its outside dimensions, may be varied within a range of load-handling capabilities simply by changing the tubular wall thickness of the internal core structure. Especially interesting about this capability of the hollow rebar structure of the present invention is that such changes in load-handling capability may be made without in any way altering the spatial volume occupied by rebar structure within surrounding concrete which itself is called upon to handle loadbearing. In other words, in the "world" of the present invention, there is provided a striking, and important, independence between rebar load-handling capability and surrounding concrete load-handling capability by virtue of the fact that a plurality of rebar load-handling capabilities lying within a range are possible without altering in any way—by diminution, for example—the load-handling capacity of the surrounding embedding concrete mass. In other words, and as an example, an increase in rebar load-handling capacity may be made without diminishing the mass volume of surrounding concrete, an action which would necessarily diminish also the load-carrying capacity of that concrete mass.

As will become more fully apparent when, later in this text, the proposed fabrication apparatus and associated methodology of the invention are described, this variable rebar load-handling capacity feature of the invention is accomplished relatively simply by using a singular, outer rotational forming die for the transfer-molding creation of the core-surrounding sleeve, and then simply by changing the outer-diameter size of an inner, central mandrel which is employed in the apparatus and methodology of the invention to form and define the inside diameter of the rebar core structure.

For illustration purposes, and looking particularly at FIG. 3, in the embodiment of rebar structure 30 so far described, the inside diameter of core 32, shown at $D_1$, is 0.5-inches, the outside diameter of the core, shown at $D_2$, is 0.732-inches (this $D_2$ dimension also, effectively, being the inside diameter of sleeve 34), the outside diameter of the sleeve, shown at $D_3$, is 0.795-inches, and the "outside diameter" of ridge structure 36, shown at $D_4$, is 0.945-inches.

With these dimensions, rebar structure 30 is structurally equivalent to conventional No. 4 fiber-reinforced polymer (FRP) solid rebar. Simply by keeping the just-stated sleeve dimensions unchanged, and by changing the outside diameter of the mandrel (mentioned above herein) which is employed in the rebar-fabrication apparatus and methodology of the invention, it is possible to make a rebar structure which is structurally equivalent to conventional No. 3 and No. 5 FRP rebar.

Focusing for a moment on ridge structure 36, indicated at P in FIG. 2 is the pitch of the winds existing for each of winds 38, 40. These winds, as illustrated in FIG. 2, and for convenience-of-display purposes only, have been purposely, distortedly "pitch-stretched' along the outside of sleeve 34 in order to minimize image crowding in this figure. A preferred pitch for each of the two winds, in relation to the rebar dimensions just stated above, is about 1.45-inches of sleeve length, with the laterally visible (as in FIG. 2) stretch of each successive wind portion appearing to lie along a line extending at an upwardly and to the right angle of about 60° relative to axis 30a. The just-mentioned pitch stretching causes this angle, as it actually appears in FIG. 2, to be smaller than 60°.

Directing attention now to FIGS. 4 and 5, here there is indicated generally at 54 a modified rebar structure having a long axis shown at 54*a*, and, while largely similar to rebar structure 30, differing from this first-described structure substantially only by the fact that it includes ridge structure 56 which is defined by but a single helical wind shown at 58. In all other respects, rebar structures 30, 54 are alike, and for this reason, like reference numbers are applied in FIGS. 4 and 5 to rebar component portions pictured there which are essentially the same as like components pictured in FIGS. 1-3, inclusive. Dimensions $D_1$, $D_2$, $D_3$, $D_4$, are identical. Rebar structure 54 is also shown associated with a surrounding body of concrete which represented by concrete fragment 41.

Considering aspects of the behavior of the hollow rebar structure of the present invention, in addition to those performance features which have already been touched upon above herein, the relatively short, chopped, carbon (or alternatively basalt) fibers that are embedded within the jacketing sleeve and ridge structure function, in addition to providing therein structural reinforcement, also are believed, because of their random, multi-directionality, to aid in "gathering" outside, environmental contact forces which the rebar structure will experience when embedded in load-bearing concrete, and in "delivering" appropriate vectors of such forces into the core in the rebar structure, and very specifically into the elongate, linear reinforcing fibers which are present in that core. These short and relatively densely organized carbon fibers also help to isolate, and to protect the e-glass fibers in the core from the potentially damaging alkaline environment of surrounding concrete.

The elongate core-embedded e-glass fibers, of course, carry the important tensile loads that are introduced into the rebar structure when it is in operative condition within load-bearing concrete.

The important bond which exists between the core and sleeve components in the proposed rebar structure plays a very significant role in the manner in which load-handling performance is implemented by that structure. The fact that the rebar structure of the invention includes, basically, the two-component, bond-united arrangement of a core and sleeve, (a) enables the construction and effective utilization of a tension-relevant core which is best designed for the handling of expected environmental tensile loads that will be experienced, and (b), introduces a core-protective, and special load-gathering and to-the-core-delivering jacketing structure which, among other things, helps to gather, multi-directionally, force vectors that become applied to the outside surface of the entire rebar structure. In a sense, therefore, the sleeve and the core are designed, in terms of their internal reinforcing fibers structures, for, among other things, extremely effective and efficient load gathering and handling.

The manner in which core/sleeve bond 42 comes into being will be explained very shortly below as the apparatus which is utilized to create the rebar structure of this invention, and the fabrication methodology which is implemented by that apparatus, are fully explained. Suffice it to say at this point that bond 42 is unique both in the sense of its resulting structural characteristics, and in relation to the manner in which it is fabricated. This bond robustly unites the core and sleeve structures so that their respective load distribution delivery and handling functions operate most effectively.

Hollowness in the overall structure deals effectively with the prior-art composite-material size-effect, shear-lag problem.

FIGS. 6A, 6B, and 7-9, inclusive, illustrate both (a) the preferred and best-mode embodiment of the apparatus of the invention which is employed to fabricate the hollow rebar structure of the invention, and (b) the methodology of the invention that is implemented by this apparatus.

In schematic form, and visualizing that FIGS. 6A and 6B are appropriately laterally linked, the entirety of the rebar fabrication apparatus is indicated generally at 60. Apparatus 60, also referred to as apparatus for making an elongate, composite-material, hollow rebar structure herein, has an overall length of about 20-feet, and possesses a central, long, axis 60*a* (see FIG. 6B) referred to as a rebar-formation axis. The left end of apparatus 60 in FIG. 6A is the upstream end, or region, of the apparatus, and the right-end of the apparatus as seen in FIG. 6B is the downstream apparatus end, or region. While different fabrication throughput speeds may be implemented under user selection, the throughput speed in apparatus 60 is substantially 12-inches-per-minute, with the throughput direction shown by a right-pointing arrow 62 in FIGS. 6A, 6B.

Extending in a manner centered on axis 60*a*, along most of the length of apparatus 60, is a tubular mandrel 64 which is suitably supported, and anchored in place, adjacent its upstream, left end in FIG. 6A. Its downstream, right end is closed by a fitted closure plug 64*a*, best seen in FIG. 7. Plug 64*a* also closes the right end (in FIG. 7) of a tubular, mandrel-internal heater shroud which will be discussed more fully below. The outside diameter of mandrel 64 herein is 0.5-inches—the dimension which defines the inside diameter of core structure 32. The mandrel's inside diameter herein is 0.375-inches. In order to give mandrel 64 some visual distinction in the small scale of FIG. 6A, and also in that of FIG. 6B, its outside surface in these two figures carries angular surface marking.

Beginning, in a description of the contents of apparatus 60, adjacent the upstream region of that apparatus, and progressing downstream from that region, apparatus 60 includes a fiber guide structure 66, a fiber-bathing resin station 68, a resin-wetted fiber condenser 70, an optional surface-texturing, peel-ply delivery station 72 (shown in dash-double-dot lines), an optional peel-ply core wrapper 74 (also shown in dash-double-dot lines), an elongate, pultrusion die 76 having a long, central axis (not specifically marked) which coincides with axis 60*a*, a resin-cooling water jacket 78 surrounding and associated with the upstream end of pultrusion die 76, three, pultrusion-die-associated-and-surrounding heaters, or heating structure, 80, 82, 84, and an optional peel-ply stripping station 86 (represented in dash-double-dot lines). Continuing downstream from optional station 86, apparatus 60 additionally includes a conventional, product-transport monitoring, rotary encoder 88, a bulk-molding-compound (BMC), high-pressure, injection system 90, a rotational, continuous-transfer-molding die 92, a pair of external, upstream/downstream heaters, or heating structure 94, 96, respectively, surrounding and associated with the outside of die 92, an internal heater 98, seen only in FIG. 7, disposed within the inside of mandrel 64 and positioned longitudinally as shown relative to heaters 94, 96, a resin-curing oven 100, a crawler-tread, or caterpillar, style, power-driven puller 102 (illustrated in FIGS. 6B, 8 and 9) whose "counter-revolving" treads are coordinatedly driven by a motor which is shown in simple, block form at 102*a*, and a chop saw 104. Chop saw 104 is suitably mounted for limited reciprocation, back and forth, on a rail structure 104*a*, and in a manner generally paralleling axis 60*a*, with this saw being so moved at appropriate moments under the influence of a reversibly-operable, motor instrumentality 104*b* which is controlled, as will be explained shortly, by an automated control system, still to be described. A connected, operative relationship between chop saw 104, rail structure 104*a*, and motor instrumentality 104*b* is illustrated by a dashed line 104*c* in FIG. 6B. Components 104, 104*a*, 104*b*, and connection 104*c*, collectively constitute a reciprocatable and activatable chop saw mechanism.

Within apparatus 60, all of the components, with the exception of mandrel-internal heater 98 and puller 102 (and its associated motor structures) are generally conventional in construction and operation. All forward motion of rebar materials moving through this apparatus is under the direct control of puller 102. In order that all necessarily interrelated component operations are properly coordinated, and while manual controlling to accomplish this is of course possible, there is preferably associated with apparatus 60 an appropriate, automated control system which is illustrated in block form at 106 in FIG. 6A—this control system including an appropriately programmed digital computer, which is connected operatively and "informationally", as shown distributively in FIGS. 6A and 6B by the evident plurality of dashed lines and associated arrowheads effectively connected to block 106, (a) to external heaters 80, 82, 84, (b) to rotary encoder 88 (for the receipt of information from this encoder), (c) to the motor (not illustrated) provided for driving rotational die 92 in the direction indicated by curved arrow 108, (d) to external heaters 94, 96, (e) to oven 100, (f) to motor 102*a* which drives puller 102, and through a pair of operative connections to components in the chop saw mechanism. Because of the drawing scale and spacings of components presented in FIG. 6B, the control connection which exists between system 106 and internal heater 98 is not here specifically pictured, but is, of course, present. This connection will be more specifically described in conjunction with a discussion presented later herein involving FIG. 7.

Regarding power-driven rotation of die 92, arrow 108 indicates that the die's rotational direction is counter-clockwise as the die is viewed along axis 60*a* from its downstream end. The rotational speed for the mentioned throughput speed of about 12-inches-per-minute, and helical wind pitch of about 1.45-inches, is about 8.3-rpm.

Regarding several of the components identified above in apparatus 60, certain additional information will be presented below in the context of the apparatus fabrication process description which now follows.

Describing now the flow of rebar fabrication activity within apparatus 60, and looking at the overall apparatus as shown in FIGS. 6A and 6B, from suitably supported conventionally available supply spools (which are not pictured in FIG. 6A, e-glass fibers 48 are extended in appropriate runs from these spools to guide structure 66 whose guide elements define an appropriately configured "field", or array, of plural fibers which are to be directed centrally toward axis 60*a* onto the outside surface of mandrel 64 as a precursor to formation, in pultrusion die 76, of the core structure of the invention. Those skilled in the art will understand fully how to select, route and create an appropriate fiber-filled field of the correct number of such fibers suitable to result in the production of a final hollow rebar structure wherein these fibers will contribute, in relation to the combined, thermoset resin, the above-mentioned, preferred volume occupancy of fibers in the formed core structure. One will note, of course, that the fiber content in this guided field will depend upon the core wall size (i.e., ID/OD) which has been chosen for the core.

From the guide structure through which the supplied fibers in the assembled field are routed, these fibers then pass through fiber bathing resin station 68 which receives, as indicated by a downwardly pointing arrow 46 disposed above it in FIG. 6A, an appropriate flow of the preferred and selected, core-intended, thermoset resin, such as that specifically identified above. In station 68, the fibers become heavily wetted/coated with this resin.

From station 68, the fibers are then routed centrally toward axis 60*a* and the outside surface of mandrel 64, and into fiber condenser 70 which effectively gathers all of these fibers and forms them, along with the wetting resin, into a precursor, composite-material core structure evenly surrounding mandrel 64, thence to emerge from the condenser in the direction of arrow 62 in progress toward the upstream, open, entry end of pultrusion die 76. Condenser 70 forms the composite core-precursor mass of fibers and resin to have a cross-sectional configuration which closely approximates that which will be formed for the core in the pultrusion die.

If the particular form of hollow rebar structure which is to be fabricated is to involve "mechanical assistance" in the bonded interface which is to be created between the outside surface of the formed core and the inside surface of the surrounding, hollow sleeve, the optionally employable texturizing peel-ply apparatus in station 72 will come into play at this point in the fabrication process. More specifically, and if this is to happen, a suitable, texturizing, peel-ply strip material, furnished appropriately in several strips, will be drawn in station 72 toward and all around the outside of the precursor core material to travel with this material into peel-ply wrapper 74 which will, effectively, properly wrap this strip material circumferentially around and along the precursor core material for transport along with this precursor material into the pultrusion die.

As was mentioned above, all of the peel-ply apparatus which may optionally be included in apparatus 60, and employed in the fabrication of a rebar structure in accordance with a modified practice of the invention, is entirely conventional in construction and operation. This apparatus, accordingly, may or may not be included as component portions of apparatus 60, and if so included, may be structured therein so that, selectively, a user may employ, or not, the optional peel-ply, texturizing practice of the invention. While different specific, texturizing peel-ply materials may be used for the optional task just described, one product which works especially well for this purpose is sold under the name Econo Ply E peel ply made by Airtech Advanced Materials Group in Huntington Beach, Calif.

The appropriately prepared, precursor core material, with or without applied peel-ply texturizing strip material, now enters pultrusion die 76, wherein it will be formed into the core structure of the present invention, a structure which is also referred to herein as a first, fiber-reinforced, curable-plastic-composite-material component. As will be explained, the core-structure formation which occurs in this die, uniquely, is formed so that the core structure that emerges from the die is in a so-called "B-staged" condition, in the sense that the included resin, and particularly the outer surface regions of that resin, preferably, are only about 90% cured. This condition is referred to also in this text as one wherein the core structure possesses included plastic material having an outwardly exposed, less than fully cured, exposed-plastic-material bonding surface. More will be said regarding this B-staged core-resin, and bonding-surface, condition, how it comes about, and why it is important, shortly.

It will be clear that the pultrusion die employed to fabricate the core structure which has been described above herein will be designed to have an internal, central, cross-sectional diameter which essentially matches the intended outside diameter of the described core structure. It will also be clear, with respect to making modified structural forms of the rebar structure of the present invention, and where it is intended that the core structure have different inside and outside diametral dimensions than those which have been described specifically above, one or both of the various diametral sizes of mandrel 64 and of the just-mentioned inside diameter of the pultrusion die will be adjusted accordingly.

Preferably, precursor core material entering the pultrusion die, and then traveling centrally along the long axis of that die. first experiences in the die a resin-cooling zone defined by die-surrounding water jacket 78, which, as indicated by a downwardly pointing arrow disposed above it in FIG. 6A, receives a flow of "normal-temperature" tap water. While this resin-cooling practice, and the use and presence of such a cooling-water jacket, are preferred, we understand that there may be instances wherein this cooling environment may not be employed. Those skilled in the art will be well-armed to make such a decision.

As the core-material mass of e-glass fibers and resin travels through the pultrusion die, which has a length herein of about 3-feet, it is subjected, in sequence, to applied heat in three different heating zones that are defined, respectively, and in a progressive and downstream sense, by heaters 80, 82, 84, respectively. For the throughput transport speed which has been described above herein, and in relation to the rebar core structure specifically described above, the heating-zone temperature produced within the die by heater 80 is preferably about 160° F., that produced by heater 82 is preferably about 170° F., and that produced by heater 84 is about 180° F. For the operational parameters which have been described so far herein, these nominally preferred pultrusion-die heating zone temperatures may vary by as much as about plus or minus 5° F.

As has been mentioned above herein, one of the important features of the present invention, with respect to the fabrication of the central core structure is that this structure, where it emerges from the pultrusion die, is B-staged, in the sense that the outer regions of the resin in this core structure is less than 100%, and specifically about 90%, cured. The importance of this unique feature of the practice of the invention is that this not-completely-cured, core-structure resin is then specially prepared, with the above-mentioned, exposed plastic-material bonding surface, to participate in the establishment of an important single-cure, reverse-temperature-gradient-cure, plastic-material molecular bond which will take place in the rotational die respecting circumsurrounding formation of the sleeve structure. While it is certainly possible that some form of modestly appropriate bonding between the core structure and the sleeve structure may take place other than through the B-staging practice of the present invention which leads to very strong molecular bonding, such a practice is most definitely less preferred.

We have determined that, given the structure of apparatus 60 as so far described, with pultrusion die 76 having the length just mentioned above, and heaters 80, 82, 84 having lengths which are related proportionately approximately as shown in FIG. 6A relative to the stated length of the pultrusion die, and given the throughput travel speed of material which is being processed, and the stated size of the intended core structure, and further given the specific heating-zone temperature levels that have been identified as being furnished by these heaters within the pultrusion die, B-staging to the 90% exit-emergence extent stated above predictably takes place. It is thus the case that, as the formed core structure emerges from the pultrusion die, the outer regions of the resin in this structure specifically have the less-than-100% cured state mentioned.

If texturizing peel-ply strip material has been employed as an option, then, peel-ply stripping apparatus, which is conventionally included in peel-ply stripping station 86, next peels away this strip material from the core structure following the core structure's emergence from the pultrusion die—such stripping activity being illustrated in FIG. 6A by the evident, arrow-headed, dash-double-dot line which extends upwardly at a slight leftwardly inclined angle in this figure from within station 86.

Immediately downstream from where the formed core structure emerges from the pultrusion die, and beyond stripping station 86, the surface of the traveling core structure is engaged by conventional rotary encoder 88 which sends appropriate information to system 106 to inform the system specifically about the then-present actual transport or travel speed of material through apparatus 60.

Just immediately beyond the rotary encoder, the formed core structure, B-staged as described, then enters the BMC high-pressure resin-injection system indicated at 90 in FIG. 6B.

Injection system 90, and rotary die 92, function collaboratively in what is referred to herein, and what is conventionally known as, a continuous-transfer-molding manner. Appropriately prepared bulk-molding-compound (BMC) material is supplied via system 90 adjacent the upstream, infeed end of rotational die 92 under very high hydraulic pressure, typically around 400-psi, and is auger force-fed into a surrounding condition relative to the previously prepared core structure which is about to enter die 92 in preparation for formation of the sleeve and ridge structure of the invention, such as previously described sleeve 34 and ridge structure 36. As has been mentioned, the apparatus which forms system 90 is entirely conventional in construction. The integrated sleeve and ridge structure which is about to be formed in the rotational die is also called herein a second, fiber-reinforced, curable-plastic-composite-material component.

The BMC material, as has also already been mentioned, may take on any one of a number of known mixes, or formulae, well understood by those skilled in the art, with this compound which is to be handled by system 90 definitively including the same (as in the formed core structure), preferred, thermoset resin mentioned above, and an appropriate, blended-in population of chopped carbon fibers at a volumetric level which will produce, in the rotationally formed sleeve and ridge structure, a volumetric occupancy by the carbon fibers in that integrated structure of about 15%.

Precursor sleeve and ridge-structure material, thus injected and forced around the formed core structure, and now entering die 92, is subjected to continuous sleeve-and-ridge-structure forming rotation of the die as indicated by curved arrow 108, with all material advancing through the die at the throughput speed of about 12-inches-per-minute under a circumstance with the central rotational component in die 92 rotating under power at the previously mentioned rate of about 8.3-rpm. As mentioned above, the drive motor which specifically, and conventionally, creates this rotational motion, and which is not illustrated in the drawings, is under the control of control system 106.

With attention, for a moment, directed specifically to FIG. 7, the central, rotational component within die 92 is shown generally at 92*a*. This generally tubular component has its hollow interior 92*b* configured appropriately to produce, around the core structure, a sleeve, and integrated, homogeneous, double-wind, helical ridge structure, having the dimensionality described earlier herein for the specific, illustrative hollow rebar structure of the invention.

Disposed inside of component 92*a*, and centrally located along the coinciding, long, central axis of this rotational die and rebar formation axis 60*a*, is mandrel 64 as shown. In the space between the outside of the mandrel and interior 92*b* in component 92a, one can see in FIG. 7 both the earlier-formed core structure 32, and the now forming sleeve and ridge structures 34, 36.

Turning attention now to the heaters, or heating structure, associated with rotational die 92, these heaters, as will be recalled, include two, external heaters 94, 96, and an internal heater 98 which appears only in FIG. 7 in the drawings. Heaters 94, 96, wrap circumferentially around the rotational die, and create respective, associated heating zones within the die at preferred temperatures therein of about 225° F. and 275° F. respectively. These preferred temperatures, we have determined, for the processing parameters that have been described so far herein, may vary from the levels just stated by about plus or minus 5° F.

In apparatus 60, the pultrusion die has an overall length of about 12-inches, and the respective lengths and dispositions of heaters 94, 96 are generally proportioned and located as illustrated in FIGS. 6B and 7.

Heater 98 resides within the previously mentioned shroud—an elongate, tubular structure designated 98a in FIG. 7. The right end of shroud 98a in this figure is closed by previously mentioned end plug 64a. Power-supply and heating-control wiring for energizing heater 98 is shown at 98b in FIG. 7, and is routed to the heater through the closed left end of the shroud, and from the upstream, open end of mandrel 64, and through the mandrel. The earlier-mentioned, system-106 control connection which is provided for, and to, internal heater 98 is through wiring 98b.

Internal heater 98 is one of the very unique contributions of the present invention, in that it cooperates in a very special way with heaters 94, 96 to cure, nearly to completion, all of the plastic resin material which is moving both in the core structure and in the sleeve and ridge structures through the rotational die. Very specifically, heater 98 produces what is referred to herein as a reverse temperature gradient which means that the temperature inside mandrel 64, and thus within the central portion of the rotational die, at the location illustrated for heater 98 declines progressing outwardly through the core and sleeve material toward the outside of the rotational die. Heater 98 creates a heat zone in its immediate area within mandrel 64 at the level preferably of about 300° F., with a permitted variation, as far as we are now able to determine, satisfactorily lying within about plus or minus 5° F.

This reverse temperature gradient works specially upon the interfacial, compatible (same), thermoset, plastic resin material which exists in the contacting, interfacial regions of the core structure and the sleeve structure near heater 98, and recalling that the B-staged condition of the outer region of the thermoset plastic material in the core exists within the rotational die, this gradient causes what is also referred to herein as a single-cure, plastic-material, molecular bond to take place—"single-cure" in the sense that curing takes place simultaneously and in a single "action" for plastic material included in the core structure and in the interior of the adjacent sleeve structure. The interfacial zone between the core and the main body of the sleeve where this single-cure activity takes place is referred to herein also as a region wherein the yet-uncured plastic material which is included in the sleeve lies in contact with the exposed, less than fully cured bonding surface mentioned above in the B-staged plastic core material. It is the special molecular bond, so produced during single-stage curing, which results in an extremely strong and robust bonded connection between the sleeve and core structures —a bond which plays a very important role in the manners described earlier herein in which load handling is performed by the hollow rebar structure of the present invention.

Such a bond may be enhanced in a mechanical fashion under circumstances where surface texturing, using the described peel-ply strip material, is employed to create a roughened surface on the outside of the precursor core material as that material prepares to enter the region of the rotational die.

Substantially completed rebar structure which emerges from the rotational die enters downstream-located oven 100 which, under the fabrication conditions that have just been described, is maintained at a temperature of around 280° F. Resin curing finishes in this oven.

Downstream from oven 100, puller 102, which is spaced from the discharge end of the rotational die by a distance of about 60-inches operates to maintain and pull the traveling rebar materials throughout processing in apparatus 60. This puller which, as has been mentioned, and as can be seen in FIGS. 6B, 8 and 9 in the drawings, is a crawler-tread-, or caterpillar-, style puller, exerts a substantial grip in the long, opposed-grip, nip region 102b presented between high-frictioning, urethane tread blocks, or cleats, such as those shown at 102c, that are mounted on sprocket (102d)-supported, endless track bands, such as track band 102e, to exert a positive, rotation-resisting, pulling purchase on the traveling rebar structure. Importantly, the puller is constructed to resist any tendency of the forming rebar structure to rotate under the rotational influence of die 92. Additionally, puller 102 is positioned relatively close (60-inches, as mentioned above, is close enough) to the discharge end of die 92 to minimize torque twisting of emerging rebar.

Downstream from puller 102, chop saw 104, moving, when instructed under the control of system 106, and the resulting controlling influence of motor instrumentality 104b, along rail structure 104a, and in readiness to perform what may be called a "relatively stationary" rebar crosscut, follows exactly, and for a relevant, short distance, the downstream apparatus-transport-speed motion and direction of the emerging and completed rebar structure. Activated, at the appropriate moment, by system 106 while so moving, it produces such a crosscut, thereby cutting free a final rebar product of a selected length. The "relatively stationary" concept simply means that, with the chop saw moving as described, in readiness for, and during, the making of a rebar crosscut, there is no relative travel motion between it and the adjacent rebar. Between crosscuts, the chop saw is moved upstream in preparation for the nest crosscut "instructions".

Accordingly, the composite-material, hollow-rebar-making apparatus proposed by the present invention, just described in detail, includes a special combination of fabrication components particularly featuring (1) a core-forming pultrusion die which collaborates with heating structure to create formed, emerging core structure whose included, emerging plastic resin material is in a 90% B-staged condition, (2) a downstream rotational transfer-molding die which forms, around the outside of the core structure, a hollow sleeve which carries integrally formed, outside, radially projecting, helical winds, and which collaborated with heating structure including a unique internal heater which effects a reverse temperature gradient to promote a specialized, single-cure plastic-resin-material molecular bond in the interface uniting the core and sleeve structure, and (3) a specialized, anti-rotation crawler-tread-type downstream puller which, while resisting all rotation of rebar structure being fabricated as potentially influenced by operation of the rotational die, firmly pulls the fabrication material steadily through the apparatus during the fabrication process.

Other componentry which is included in the overall fabrication apparatus of the invention cooperates with these several particular components to produce the hollow rebar structure of the invention.

From the description just given of apparatus 60, it should be apparent how this apparatus implements the earlier described method of the invention which includes, according to one manner of expressing it, the steps of (1) forming, in a pultrusion die, an elongate, composite-material, fiber-reinforced curable-plastic-material-including, hollow core, (2) applying heat within the pultrusion die to create, for the core's included plastic material as it emerges from the die, an outer-surface plastic condition which is less than 100% cured, (3) in association with, and downstream from, the core-forming step, preparing, in a rotational, continuous-transfer-molding die, on the less-than-100%-cured outer-surface plastic of the core, and along the core's length, an elongate, hollow, composite-material, fiber-reinforced, curable-plastic-material-including, core-circumsurrounding sleeve, (4) in relation to the preparing step, and within the transfer-molding die, creating unitarily with the sleeve, and in a manner distributed along the length of the sleeve's outer surface, an external-purchase-enhancing structure possessing radial-dimensionality, and (5), within the transfer-molding die, applying heat to effect between the plastic material in the core and that in the sleeve both a single-cure, and a reverse-temperature-gradient-cure, plastic-material molecular bond.

As an important sub-aspect of this just-described methodology, the proposed methodology also involves what we refer to as stage-creating, and then joining, first and second, fiber-reinforced, curable-plastic-composite-material components, including the steps of (1) forming the first component to a condition wherein it possesses, respecting its included plastic material, an outwardly exposed, less than fully cured, exposed-plastic-material bonding surface, (2) forming, on this less than fully cured bonding surface in the first component, the second component, and doing so in a manner whereby the second component possesses, respecting its included plastic material, a yet-uncured, exposed-plastic-material bonding surface which is in contact with the less than fully cured bonding surface in the first component, and (3) in a heat-applying, cure-simultaneity procedure, effecting between the first and second components a single-cure, molecular bond.

Considering now another, alternative embodiment of the proposed rebar structure, FIG. 10 illustrates generally, and in fragmentary fashion, at 110, an elongate hybrid hollow rebar structure formed in accordance with an alternative facet of the invention the invention. Hybrid structure 110 possesses a central, long axis, shown at 110*a*, and centered on this axis, an elongate, central, hollow, composite-material core 112 having the same kind of hollow interior and outer surface which was described earlier in conjunction with rebar structure 30, an elongate hollow sleeve 114 having the same kinds of inner and outer surfaces described earlier for sleeve 34, and a dual-wind, helical ridge structure 116 formed on the outer surface of sleeve 114, which ridge structure is essentially the same in construction as previously described ridge structure 36. Ridge structure 116 functions, in relation to rebar structure 110, as the external-material purchase-enhancing structure of the invention.

The core and sleeve in rebar structure 110 are molecularly bonded to one another in exactly the same fashion described above for bonding which exists between the core and sleeve in rebar structure 30.

Particularly distinguishing this hybrid structure from the earlier-described rebar structures is the included presence of an elongate rigidifier 118 which is load-bearingly, and cooperatively, received inside the hollow interior of core 112. Rigidifier 118 may preferably be formed of a very high-load-bearing-capability material, such as steel, may have a length of any desired nature, may be bonded suitably to the inside of core 112, and, if desired, may extend beyond the end of a formed rebar structure 110 to link and rigidify a pair of such rebar structures.

Moving attention now to yet another, the systemic, facet of the present invention, this facet recognizes the opportunities, furnished by the hollow rebar structure of the invention to do certain things systemically, as, for examples, (a) linking plural rebars linearly or angularly, (b) attaching various kinds of couplers for this linking purpose, (c) attaching specialized fittings for different installation applications, (d) closing off open ends of rebars to protect other kinds of infrastructure, such as cabling, placed in the hollow interiors of the cores in the hollow rebar structure, and (e) other things.

One way of expressing the systemic nature of the invention is that it features first and second, elongate, hollow-interior, composite-material rebar elements having ends, and a composite-material coupler disposed between, anchored to, and joining a pair of adjacent ends in these elements. The elements in this system have respective long axes, and the coupler may be configured to orient these axes in a condition of nonalignment relative to one another. Further, in certain specific instances, the hollow interiors of the elements communicate with the elements' ends which are open, and the coupler is elongate, and possesses along its length a double-open-ended hollow interior which communicates with the hollow interiors in the elements.

Another systemic view of the invention is that it proposes a composite-material rebar system including an elongate, composite-material rebar element, and a defined-function fitting joined to that element. Optionally, the system fitting is positionally-adjustably joined to the element.

Other ways of describing/viewing the invention's systemic character will become apparent from the discussion below regarding FIGS. 11-19, inclusive.

FIGS. 11-19, inclusive, illustrate respectively different, representative (but not exhaustive) couplings(or couplers) and fittings, all referred to collectively as designed-function fittings, proposed by the invention for hollow-rebar-compatible, systemic uses. The fittings and couplings illustrated in these figures are preferably formed of cast epoxy resin. The respective features of their structures are substantially self-evident from the drawings, and require but little specific discussion. These fittings and couplings, also referred to as components, collaborate in different, also quite evident, ways with the hollow rebar structure of the invention to offer the systemic-invention features that take advantage of the invention-proposed hollow rebar structure. Those skilled in the art will recognize that the exact configurations of these several, pictured components may be varied considerably to deal with different, specific situations, some of which are discussed herein principally for representational illustration purposes.

Figure 11:
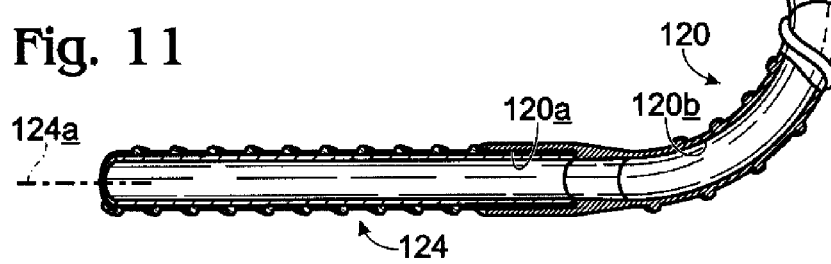

Accordingly, FIG. 11 pictures a right-angle, hollow coupling 120. This coupling is shown in an operational condition angularly uniting, and here specifically right-angularly uniting, a pair of hollow rebar structures, or elements, 122, 124, which are like previously described rebar structure 30, and which respectively possess long axes 122*a*, 124*a* that are, because of coupling 120, relatedly, angularly non-aligned. Right-angularity as a rebar "connection" mode selected for presentation in FIG. 11, of course, is simply, an illustration of one structural way in which a coupling may be configured and employed to join two rebars in an angularly non-aligned, systemic manner, in accordance with practice of the present invention.

Coupling 120 is of a style formed with opposite, hollow ends, such as hollow end 120a, which communicate with its central, hollow interior 120b, and which are diametrically sized to receive, for joinder purposes, the inserted ends of rebars, such as the illustrated, inserted ends of rebars 122, 124. Suitable adhesive bonding may be used to anchor coupling 120 to rebars 122, 124. The hollow interior, 120b, of coupling 120 communicates through the coupling's hollow ends with the hollow interiors of rebars 122, 124, thereby furnishing a unique, and effective, connection-continuum of and for the hollow, central passageways in the rebars' cores. Each connection shown in FIG. 11 between an end of coupling 120 and an end of one of rebars 122, 124 is referred to herein as being an "element-received-in-coupler relationship". Coupling 120 is referred to as being elongate, and as possessing a double-open-ended, hollow interior which communicates with the interiors of connected, hollow rebar elements.

Such systemic joinder offers extensive possibilities for linking plural, elongate, hollow rebar structures in a wide variety of ways—for example to tie and unite plural-rebar load-handling capabilities in cooperative and imaginative ways, and to establish continuous, connected, rebar-central, simple or complex vias for cabling, for fluid-flow, for load-handling-behavior monitoring, and for many other things, FIG. 12 pictures at 126 a modified form of a right-angular, hollow coupling which differs from coupling 120 essentially only by having differently configured opposite ends, and specifically ends, such as end 126a, that are sized for insertion (as shown) into, and thereafter for suitable adhesive bonding in, the ends of two, right-angularly disposed, hollow rebars, such as the two, connected rebar structures which are pictured at 128, 130 with their respective long axes 128a, 130a non-aligned, and at a right angle relative to one another. Coupling end 126a is illustrated so inserted in end 130b of rebar 130 Each connection shown in FIG. 12 between an end of coupling 126 and an end of one of rebars 128, 130 is referred to herein as being a "coupler-received-in-element relationship".

Illustrated at 132 in FIG. 13 is an elongate hollow coupling which is very similar in many ways to previously described coupling 120, basically with just the exception that coupling 132 is U-shaped in configuration. In FIG. 13, coupling 132 is shown with its opposite ends connected to ends in two, hollow rebar structures 134, 136 that are substantially the same in construction as previously described rebar structure 30. The long central axes 134a, 136a, of rebar structures 134, 136, respectively, are non-aligned with one another, and specifically are parallel and spaced from one another because of their illustrated endo connections with the opposite ends of coupling 132. The specific connections illustrated in FIG. 13 between the pictured, two rebar structures and the U-shaped coupling are essentially the same as those illustrated between coupling 120 and rebar structures 122, 124, in FIG. 11.

In FIG. 14, shown at 138 is an end-to-end, straight-linear rebar connector having a long axis 138a, a central enlargement 138b, and a pair of axially aligned, elongate ends 138c, 138d which are designed for insertion into the hollow interiors of the core ends in two, axially aligned (along axis 138a), elongate, hollow rebar structures (not shown in this figure). Connector 138 is a solid, element.

FIG. 15 shows a straight-linear, hollow coupling 140 having a long axis 140a. Coupling 140 is intended to receive, within its opposite ends, inserted ends of two, axially aligned rebar structures, such as the two rebar structures which are shown at 142, 144.

At 146 in FIG. 16, there is illustrated a truncated-conical, hollow rebar anchor, or fitting, possessing, in and along its hollow interior, reception threads 146a adapted, threadingly, to receive an inserted length of a hollow rebar structure, such as that shown at 148, with the threads in this anchor being designed matchingly to engage with the ridge-structure winds in such a rebar structure. A device such as anchor 146 may freely be positioned at any point along the length of a rebar structure, and may be located in a rebar installation so as to furnish desired, additional, secure, positional anchoring of the rebar against axial movement within a surrounding mass of concrete.

FIG. 17 in the drawings shows at 150 a solid T-connector having elongate legs 150a, 150b, 150c which are adapted to be inserted within the hollow interiors of the cores in three to-be-T-connected, elongate, hollow rebar structures, such as the rebar structure which is shown in this figure at 152 in a position about to be connected to T-connector leg 150c.

FIG. 18 illustrates at 154 what might be thought of as a two-plane T-connector having elongate legs 154a, 154b, 154c, 154d adapted to be inserted into the receiving hollow ends of four, different elongate hollow rebar structures, such as the four such structures pictured at 156, 158, 160, 162.

Finally, FIG. 19 in the drawings shows at 164 what may be referred to as a spider-leg end closure plug having a rebar-end closure cap 164a on the inner side of which there are joined spider-like spring legs, such as those shown at 164b, intended, springingly, to engage the inside surface of the hollow interior of the core in a rebar structure, such as that shown at 166.

Accordingly, all of the facets of the present invention mentioned hereinabove have been illustrated and described, various possible modifications have been discussed, and notable structural and functional advantages of these facets have been identified. Notwithstanding this, we appreciate that other variations and modifications may be perceived and made by those skilled in the art, and it is our intention that all such other variations and modifications will be understood to be with in the spirit of the invention and the following claims.

We claim:

1. Elongate, composite-material, hollow rebar structure having a long axis, and comprising
    an elongate, hollow core centered on said axis and having an outer surface,
    an elongate, hollow sleeve having inner and outer surfaces, circumsurrounding said core along the core's length, with the sleeve's said inner surface bonded to the core's said outer surface along the length thereof, and
    longitudinally distributed, radial-dimensionality, external-purchase-enhancing structure formed unitarily with the sleeve's outer surface along the length thereof.

2. The rebar structure of claim 1, wherein said core and sleeve are circularly cylindrical.

3. The rebar structure of claim 1, wherein said external-purchase-enhancing structure takes the form of elongate ridge structure joined to and projecting radially outwardly from the sleeve's said outer surface relative to said axis.

4. The rebar structure of claim 3, wherein said ridge structure is distributed in a manner disposed in a generally helical fashion winding effectively about said axis along the length of the sleeve's said outer surface.

5. The rebar structure of claim 4, wherein said ridge structure includes an elongate, continuous, generally helically wind extending along the length of the outer surface in said sleeve.

6. The rebar structure of claim 4, wherein said ridge structure takes the form of a pair of elongate, continuous, generally helically paralleling winds extending along the length of the outer surface in said sleeve.

7. The rebar structure of claim 6, wherein said winds are homogeneous with said sleeve.

8. The rebar structure of claim 1, wherein bonding structure existing between said core and sleeve takes the form of a molecular bond.

9. The rebar structure of claim 8, wherein said molecular bond is a single-cure, plastic-material bond.

10. The rebar structure of claim 9, wherein said single-cure bond is, additionally, a reverse-temperature-gradient-cure bond.

11. The rebar structure of claim 8, wherein said molecular bond is a reverse-temperature-gradient-cure, plastic-material bond.

12. The rebar structure of claim 1, wherein bonding between said core and sleeve takes the form of a molecular and mechanical bond.

13. The rebar structure of claim 12, wherein said mechanical bond includes a roughened texture existing on the outer surface of said core in contact with the inner surface of said sleeve.

14. The rebar structure of claim 1, wherein the core and the sleeve are formed of different, yet molecularly bondable, materials.

15. The rebar structure of claim 14, wherein said different materials include a common, thermoset plastic substance.

16. The rebar structure of claim 14, wherein said different materials each includes a thermoset substance.

17. The rebar structure of claim 1, wherein said core is a pultruded structure, and said sleeve is a continuous transfer-molded structure.

18. The rebar structure of claim 17, wherein said core is formed of plastic-resin-embedded, elongate, continuous, reinforcing fibers, and said sleeve and purchase-enhancing structure are formed of plastic-resin-embedded, randomly-ordered, chopped, reinforcing fibers in the form of BMC material.

19. The rebar structure of claim 18, wherein said elongate fibers are formed of e-glass, and said randomly-ordered, chopped fibers are formed of at least one of carbon, basalt and e-glass.

20. The rebar structure of claim 18, wherein the material in said sleeve is structured to be substantially inert to degradation in the contact environment of structural concrete, and furnishes an alkaline barrier for said core.

21. An elongate, composite-material sleeve employable as a jacketing structure for an elongate, hollow-rebar, central core having a long, core axis comprising
an elongate, hollow body formed with a long axis, and having a hollow interior adapted to receive, bondedly, such a core in a manner wherein said two long axes are substantially coincident.

22. The sleeve of claim 21, wherein said body includes, distributed along its length, an outside surface formed unitarily with longitudinally distributed and extending, radial-dimensionality, external-purchase-enhancing structure.

23. Elongate, hybrid, hollow rebar structure having a long axis, and comprising
an elongate, composite-material, hollow core having a hollow interior centered on said axis, and an outer surface,
an elongate rigidifier load-bearingly and cooperatively received within said hollow interior, and
an elongate, composite-material, hollow sleeve having inner and outer surfaces, circumsurrounding said core along the core's length, with the sleeve's said inner surface bonded to the core's said outer surface along the length thereof.

24. The rebar structure of claim 23 which further comprises longitudinally distributed, radial-dimensionality, external-purchase-enhancing structure formed unitarily with the sleeve's outer surface along the length thereof.

25. A composite-material rebar system comprising
first and second, elongate, hollow-interior, composite-material rebar elements having ends, and
a composite-material coupler disposed between, anchored to, and joining a pair of adjacent ends in said elements.

26. The rebar system of claim 25, wherein said elements have respective long axes, and said coupler orients said axes in a condition of nonalignment relative to one another.

27. The rebar system of claim 25, wherein the hollow interiors of said elements communicate with the elements' ends which are open, and said coupler is elongate, and possesses along its length a double-open-ended hollow interior which communicates with the hollow interiors in said elements.

28. The rebar system of claim 25, wherein said coupler is anchored to said elements via one of an element-received-in-coupler relationship, and a coupler-received-in-element relationship.

29. A composite-material rebar system comprising
an elongate, composite-material rebar element, and
a defined-function fitting joined to said element.

30. The system of claim 29, wherein said fitting is positionally-adjustably joined to said element.

31. An elongate, hollow, composite-material rebar comprising
an elongate, hollow core having a long axis, and formed of a heat-cured, thermoset, resin in which are embedded plural, elongate e-glass fibers having long axes substantially paralleling the core's long axis,
an elongate jacket circumsurrounding said core along its length, formed of a heat-cured thermoset resin which is chemically compatible with the core resin, and in which are embedded plural, randomly distributed and oriented, chopped, e-glass fibers, and including (a) a tubular sleeve possessing an outer surface, and (b), extending unitarily along the length of said sleeve's said outer surface, elongate, helical, radial-dimensionality, external-purchase-enhancing ridge structure.

32. The rebar of claim 31, wherein said ridge structure includes double-helix winds.

* * * * *